United States Patent
Badawy et al.

(10) Patent No.: US 12,413,594 B2
(45) Date of Patent: *Sep. 9, 2025

(54) SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS

(71) Applicant: SailPoint Technologies, Inc., Wilmington, DE (US)

(72) Inventors: Mohamed M. Badawy, Round Rock, TX (US); Jostine Fei Ho, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,282

(22) Filed: Mar. 8, 2024

(65) Prior Publication Data

US 2024/0214383 A1  Jun. 27, 2024

Related U.S. Application Data

(63) Continuation of application No. 17/825,545, filed on May 26, 2022, now Pat. No. 11,962,597, which is a continuation of application No. 16/861,335, filed on Apr. 29, 2020, now Pat. No. 11,388,169, which is a continuation of application No. 16/691,998, filed on Nov. 22, 2019, now Pat. No. 10,681,056.

(60) Provisional application No. 62/771,889, filed on Nov. 27, 2018.

(51) Int. Cl.
*H04L 29/06* (2006.01)
*G06F 16/901* (2019.01)
*H04L 9/40* (2022.01)

(52) U.S. Cl.
CPC ........ *H04L 63/102* (2013.01); *G06F 16/9024* (2019.01); *H04L 63/104* (2013.01)

(58) Field of Classification Search
CPC . H04L 63/102; H04L 63/104; H04L 63/1425; H04L 63/20; H04L 63/1433; G06F 16/9024
See application file for complete search history.

(56) References Cited

U.S. PATENT DOCUMENTS

| | | | |
|---|---|---|---|
| 9,679,125 B2* | 6/2017 | Bailor | G06F 21/316 |
| 11,610,205 B1 | 3/2023 | Fain | |
| 11,962,597 B2 | 4/2024 | Badawy | |

(Continued)

OTHER PUBLICATIONS

Office Action for U.S. Appl. No. 18/534,067, mailed Sep. 5, 2024, 12 pgs.

(Continued)

*Primary Examiner* — Longbit Chai
(74) *Attorney, Agent, or Firm* — Sprinkle IP Law Group

(57) ABSTRACT

Systems and methods for artificial intelligence systems for identity management systems are disclosed. Embodiments may perform outlier detection and risk assessment based on identity management data, including one or more property graphs or peer groups determined from those property graphs, to determine identity management artifacts with 'abnormal' patterns when compared to other related identity management artifacts.

21 Claims, 21 Drawing Sheets

(56) References Cited

U.S. PATENT DOCUMENTS

| | | |
|---|---|---|
| 11,966,858 B2 | 4/2024 | Badawy |
| 12,041,056 B2 | 7/2024 | Badawy |
| 12,056,588 B2 | 8/2024 | Badawy |
| 12,254,422 B2 | 3/2025 | Badawy |
| 12,294,584 B2 | 5/2025 | Badawy |
| 2019/0114342 A1* | 4/2019 | Orun .................... G06F 16/215 |
| 2024/0211782 A1 | 6/2024 | Badawy |
| 2024/0267384 A1 | 8/2024 | Badawy |
| 2024/0356925 A1 | 10/2024 | Badawy |
| 2025/0094628 A1 | 3/2025 | McDonnell |
| 2025/0173591 A1 | 5/2025 | Badawy |

OTHER PUBLICATIONS

Office Action for U.S. Appl. No. 18/600,241, mailed Sep. 19, 2024, 11 pgs.

Notice of Allowance for U.S. Appl. No. 17/948,635, mailed Mar. 27, 2024, 8 pgs.

Notice of Allowance for U.S. Appl. No. 18/600,241, mailed Oct. 30, 2024, 6 pgs.

Notice of Allowance for U.S. Appl. No. 18/534,067, mailed Jan. 23, 2025, 6 pgs.

* cited by examiner

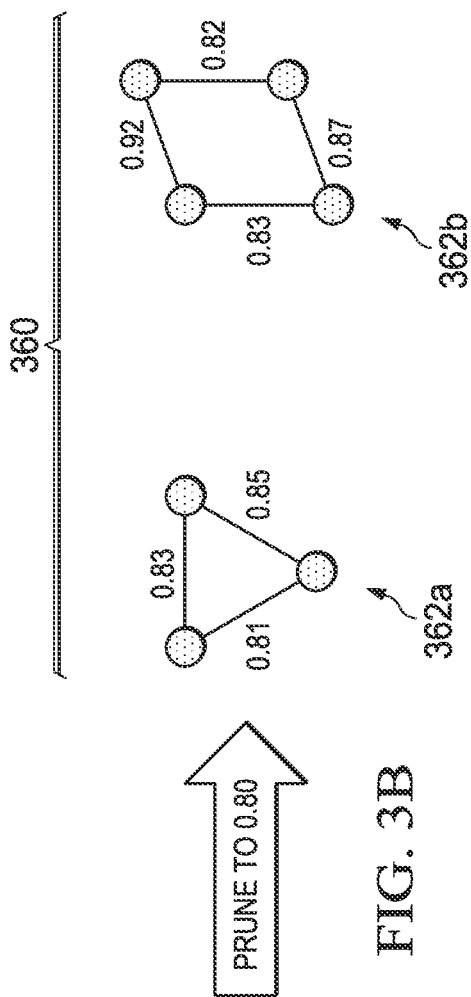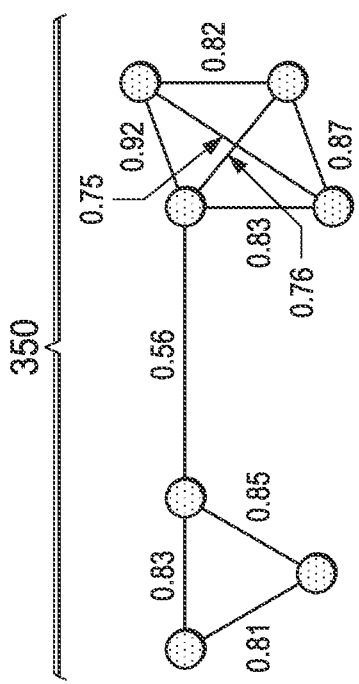
FIG. 3B

| Department | Job_Title | Location | Number_of_singletons |
|---|---|---|---|
| "NA" | "Service Account" | "NA" | 57 |
| "IT-QA" | "Contractor-Quality Assurance Analyst" | "_Manila" | 32 |
| "IT-Application Delivery" | "Software Engineer, Sr" | "Tampa" | 18 |
| "NA" | "NA" | "NA" | 17 |
| "IT-Client Services" | "Systems Engineer, Sr" | "Tampa" | 11 |
| "IT-Application Delivery" | "Software Engineer" | "Tampa" | 9 |
| "IT-Application Delivery" | "Mgr, Application Development" | "Tampa" | 8 |
| "IT-Application Delivery" | "Software Engineer, Lead" | "Tampa" | 6 |
| "IT-Enterprise Info Management" | "Data Engineer, Sr" | "Tampa" | 6 |
| "IT-Enterprise Info Management" | "Mgr, Enterprise Info Mgmt" | "Tampa" | 6 |
| "IT-Application Delivery" | "Business Systems Analyst, Sr" | "Tampa" | 5 |
| "IT-Enterprise Info Management" | "Data Engineer" | "Tampa" | 5 |
| "IT-Application Delivery" | "Application Administrator" | "Tampa" | 5 |
| "IT-Enterprise Info Management" | "Data Engineer, Associate" | "Tampa" | 4 |
| "IT-Client Services" | "Systems Engineer, Lead" | "Tampa" | 4 |
| "IT-Enterprise Info Management" | "Contractor-Data Engineer" | "Tampa_W/T" | 4 |

FIG. 10

SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS

RELATED APPLICATIONS

This application is a continuation of, and claims a benefit of priority under 35 U.S.C. 120 of the filing date of U.S. patent application Ser. No. 17/825,545 filed May 26, 2022, issued as U.S. Pat. No. 11,962,597, entitled "SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS", which is a continuation of, and claims a benefit of priority under 35 U.S.C. 120 of the filing date of U.S. patent application Ser. No. 16/861,335 filed Apr. 29, 2020, issued as U.S. Pat. No. 11,388,169, entitled "SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS", which is a continuation of, and claims a benefit of priority under 35 U.S.C. 120 of the filing date of U.S. patent application Ser. No. 16/691,998 filed Nov. 22, 2019, issued as U.S. Pat. No. 10,681,056, entitled "SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS", which claims the benefit of priority under 35 U.S.C. § 119 to U.S. Provisional Application No. 62/771,889 filed Nov. 27, 2018, entitled "SYSTEM AND METHOD FOR OUTLIER AND ANOMALY DETECTION IN IDENTITY MANAGEMENT ARTIFICIAL INTELLIGENCE SYSTEMS USING CLUSTER BASED ANALYSIS OF NETWORK IDENTITY GRAPHS," which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to identity management in a distributed and networked computing environment. More specifically, this disclosure relates to graph based identity management artifact peer grouping and analysis, and uses of the same for identity governance and management in an enterprise computing environment. Even more specifically, this disclosure relates to using property graphs or associated peer groups for risk detection, assessment or management.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

To assist in mitigating these risks, therefore, it is of utmost importance to effectively analyze access or entitlement data in the enterprise environment to determine or assess the efficacy or enforcement of such governance policies and to identify potential risks. Consequently, what is desired are improved ways to quantitatively or qualitatively analyze access data in distributed networked computing environment and to utilize the results of such analysis to improve identity governance in that environment.

SUMMARY

Accordingly, to ameliorate these issues, among other ends, embodiments of the identity management systems disclosed herein may utilize a network graph approach to peer grouping of identities of distributed networked enterprise computing environment. Specifically, in certain embodiments, data on the identities and the respective entitlements or other artifacts assigned to, or associated with, each identity as utilized in an enterprise computer environment may be obtained by an identity management system. Using the identity and entitlement data, then, a property graph may be constructed, where the nodes of the graph correspond to, and represent, each of the identities or other artifacts. Each edge (or relationship) of the graph may join two nodes of the graph and be associated with a similarity weight representing a degree of similarity between the identities (or other artifacts) of the respective nodes. The property graph may then be pruned to remove weak edges (e.g., those edges whose similarity weight may fall below a pruning threshold). The pruned graph can then be clustered into peer groups of identities or other artifacts (e.g., using a graph based community detection algorithm). These peer groups (e.g., of identities, entitlements, roles, etc.) can then be stored (e.g., separately or in the property graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities or other artifacts (e.g., such as entitlements or roles) may be optimized based on a peer group assessment metric, such as, for example, graph modularity determined based on the identity graph or the determined peer groups. For instance, in one embodiment if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities and a peer group assessment metric determined based on the newly pruned identity graph or the newly determined peer groups. If this new peer assessment metric is now above (or below) the quality threshold the feedback loop may stop and these peer groups of identities can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the property graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups resulting from the clustering) may more accurately reflect particular requirements or the needs of a particular enterprise or be better tailored to a particular use.

Using the graph format used by certain embodiments, allows the translation of domain and enterprise specific concepts, phenomena, and issues into tangible, quantifiable, and verifiable hypotheses which may be examined or validated with graph based algorithms. Accordingly, embodiments may be especially useful in assessing risk and in compliance with security policies or the like.

Historically, such security risks associated with user entitlements have been hard to quantify. In large organizations, user access data or data on user entitlements can be scattered across hundreds of systems and applications and can be difficult to compile, analyze, and present in a manageable format to the persons in position to act on the information. Consequently, most organizations attempt to manage risk in a decentralized manner, focusing on a single application or system at a time.

Such decentralized, one-at-a-time approaches have several drawbacks. With such approaches, managers, auditors or compliance officers may not gain enterprise level visibility of access risk across all at-risk resources. Risk management, even within an organization, may be applied sporadically and thus may prove to be insufficient or ineffective in minimizing access risks posed by inside users. Also, when risk management is decentralized, baselines (such as standards, measures, benchmarks, etc.) utilized in assessing risk may vary from department to department, system to system, and application to application even within the same organization. Moreover, previously available approaches can be time consuming, tedious, impracticable, and expensive since conventional risk management processes often consist of manual reviews of user entitlements and access lists.

To illustrate more specifically, identifying risk items may be one of the first step towards developing effective risk management procedures to deal with vulnerabilities as soon as they arise. Defining, identifying, and assessing risk is, however, a highly non-trivial task. This is due to risk not being well-defined across different industries. Moreover, assessing and quantifying risk may require considerable domain-specific and nuanced expertise, which makes it an extremely challenging task for current methods to approximate such a level.

The graph based identity management systems as disclosed herein allows improved graph-based approach to detection of risks, including risks associated with identities, or other artifacts, of an enterprise. This is because identity governance is predicated on the principle that strongly similar identities should be awarded similar access. In other words, a person's access profile should not be too much different from their peers. Consequently, identities whose access patterns are dramatically and unjustifiably different from their peers may be considered or identified as a source of risk.

In particular, a peer group (of identities, entitlements, or roles) is a social structure. Therefore, graph representations of identities, entitlements, roles or other identity management artifacts (e.g., coupled with a proper choice of similarity measure), creates a faithful and tangible model of the similarity structure of those artifacts with respect to an enterprise. Thus, an identity graph (e.g., when pruned to a high degree of similarity) should approximate the hierarchical structure of an organization. Moreover, robust, efficient graph clustering algorithms yield peer groups within the graph of high quality. Graphs also lend themselves to visual presentations that allows communication of deeper, identity-level insights and deliver them directly to the user via an intuitive interface. Additionally, several graph analytics tools can be utilized to detect outlier entities (identities, entitlements, or roles) and can be implemented as queries directly on a graph database, expediting & simplifying (by unifying) a production implementation and improving scalability of those implementations.

In one embodiment, therefore an identity management system may analyze property graphs, or identity management data generally, to identify associated identity management artifacts as high risk. In the context of a graph, the analysis may include analyzing the graph to identify outlier nodes of the graph to identify the associated identity management artifact as high risk. High risk identity management artifacts or outlier nodes may be presented to a user along with, for example, a risk amelioration recommendation for the identified high risk identity management artifact.

Thus, in some embodiments an identity management system may employ static risk assessment using an identity graph generated by the identity management system. In such static risk assessment, an identity management system may utilize an identity graph or peer groups determined from that identity graph to determine the identities with the most 'abnormal' entitlement patterns when compared to other related identities (e.g., identities in a similar department, physical location, peer group, etc.). The criteria used to determine whether an identity is abnormal may be a wide variety of criteria in different embodiments, including, for example, degree of connectivity or in-betweenness of a node in the graph representing that identity, or another criteria.

To give an example, identities represented by isolated nodes in the identity graph, which are referred to as 'singletons', indicate that all their connections' strength fall below the pruning threshold. This indicates that their entitlements or entitlement patterns may be rare. These identities may accordingly pose a higher risk from an identity governance perspective and should be reported for further proper action (e.g., a targeted certification campaign).

An identity management system may also employ dynamic risk assessment in certain embodiments to detect risk based on two or more graphs generated by the identity management systems from data reflecting two or more different points in time. In such dynamic risk assessment, identities with 'abnormal' dynamic patterns (e.g., usage patterns, varied attributes or entitlements) may be identified using the two or more graphs or identity management data related to event in association with those identity graphs. For instance, analyzing the event log data of an enterprise's applications, which can be obtained from identity management systems, a 'normal' usage baseline may be established by modeling an aggregated (e.g., averaged, median, etc.) usage signal or events for a unit (e.g., department, peer group, etc.). Identities whose usage patterns substantially deviate from this baseline may be identified as outliers and flagged as 'abnormal' or risky identities. Events of interest may include, but not limited to, login attempts, password change, time-stamped ip-inferred user location, application access, time-stamped file access and data transfer, or the like.

Accordingly, systems and methods disclosed herein can provide IT compliance and governance managers, auditors, compliance officers and others simple, intuitive means to assess the effectiveness of identity management and the associated access risk across large numbers of identities, entitlements, roles, users, applications, systems, etc. By increasing the visibility of user access risk at various levels across various resources, enterprises can pinpoint at-risk areas and focus their security and access control efforts where such focus may be desired.

Various embodiments may thus allow for new, in-depth insights into access risk which can enable enterprises to efficiently, effectively, and globally track, analyze, and control user access to resources. Access risks can be quickly and easily assessed in some embodiments. Access risk issues can be identified, prioritized, and immediately remediated or mitigated in various embodiments. Access risk management, in accordance with various embodiments, can help ensure regulatory compliance in a cost effective manner while also meeting appropriate standards related to enterprise governance. In accordance with some embodiments, organizations can focus their access risk management efforts strategically, track progress over time, and provide quantifiable proof of enhanced security and reduced access risk.

Embodiments provide numerous advantages over previously available systems and methods for measuring access risk. As embodiments may be based on a graph representation of identity management data, the graph structure may serve as a physical model of the data, allowing more intuitive access to the data (e.g., via graph database querying, or via graph visualization techniques). This ability may yield deeper and more relevant insights for users of identity management systems. Such abilities are also an outgrowth of the accuracy of the results produced by embodiments as disclosed.

Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of identity graphs and clustering approaches by reducing the computation time and processor cycles required (e.g., and thus improving processing speed) and simultaneously reducing memory usage or other memory requirements.

Similarly, a network graph approach to peer grouping will expose and utilize the strong homophily aspects inherent in this use case. By capturing the homophilic nature of identity governance, the opportunity arises for a large number of applications of peer groups of identity graphs, or other entity graphs, including, for example, identification and mitigation of outlier identities, role mining, automation of access approval and certification campaigns, predictive modeling of entitlement spread or diffusion within a peer group or the whole population and compliance assessment use cases, among others.

As yet another advantage, embodiments may be dynamic with respect to time, allowing the development update processes using deltas between snapshots of data collection, bringing down operational costs and improving the performance and robustness of embodiments.

Moreover, the graph format used by certain embodiments, allows the translation of domain and enterprise specific concepts, phenomena, and issues into tangible, quantifiable, and verifiable hypotheses which may be examined or validated with graph-based algorithms. Accordingly, embodiments may be especially useful in assessing risk and in compliance with security policies or the like. Similarly, the use of the graph format in certain embodiments may facilitate the storage of the data representing the graph in a graph database such as Neo4J or the like. The implementation of these graph based algorithms for analyzing or determining risk may therefore be implemented using queries on such a graph database. As the graph database may be especially tailored for these types of queries, the use cases for outlier detection and other types of risk analysis or assessment may be expedited and simplified by implementing them as graph database queries. This ability, in turn, may simplify the implementation of this analysis and assessment in a production environment and improve the scalability of such implementations.

Embodiments of identity management systems that use identity graphs may provide a number of advantages in the context of access risk detection and assessment. Specifically, embodiments of an identity management system utilizing identity graphs may be able to delve more deeply into the granular structure of the similarity or equivalence of access entitlements, and to compare and classify entitlement patterns within a peer group. As a result, anomalies of, or within, such identity graph structures may be highly relevant and useful for identity governance applications and risk management.

Moreover, graph visualizations can provide users in an enterprise with necessary confirmation regarding the evaluation of access risk based on the graph, including outlier identities or the like, allowing empirical verification of access risks or proposed remedies. Moreover, as embodiments of identity management systems may dynamically update the graph with new data, enterprises may continuously monitor the evolving status of access risks and associated identities and abnormal entitlement usage patterns by those identities.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 3A, 3B, 3C, 3D and 3E depict example visual representations of identity graphs.

FIG. 10 depicts example data for singleton identities.

DETAILED DESCRIPTION

Figure 1:
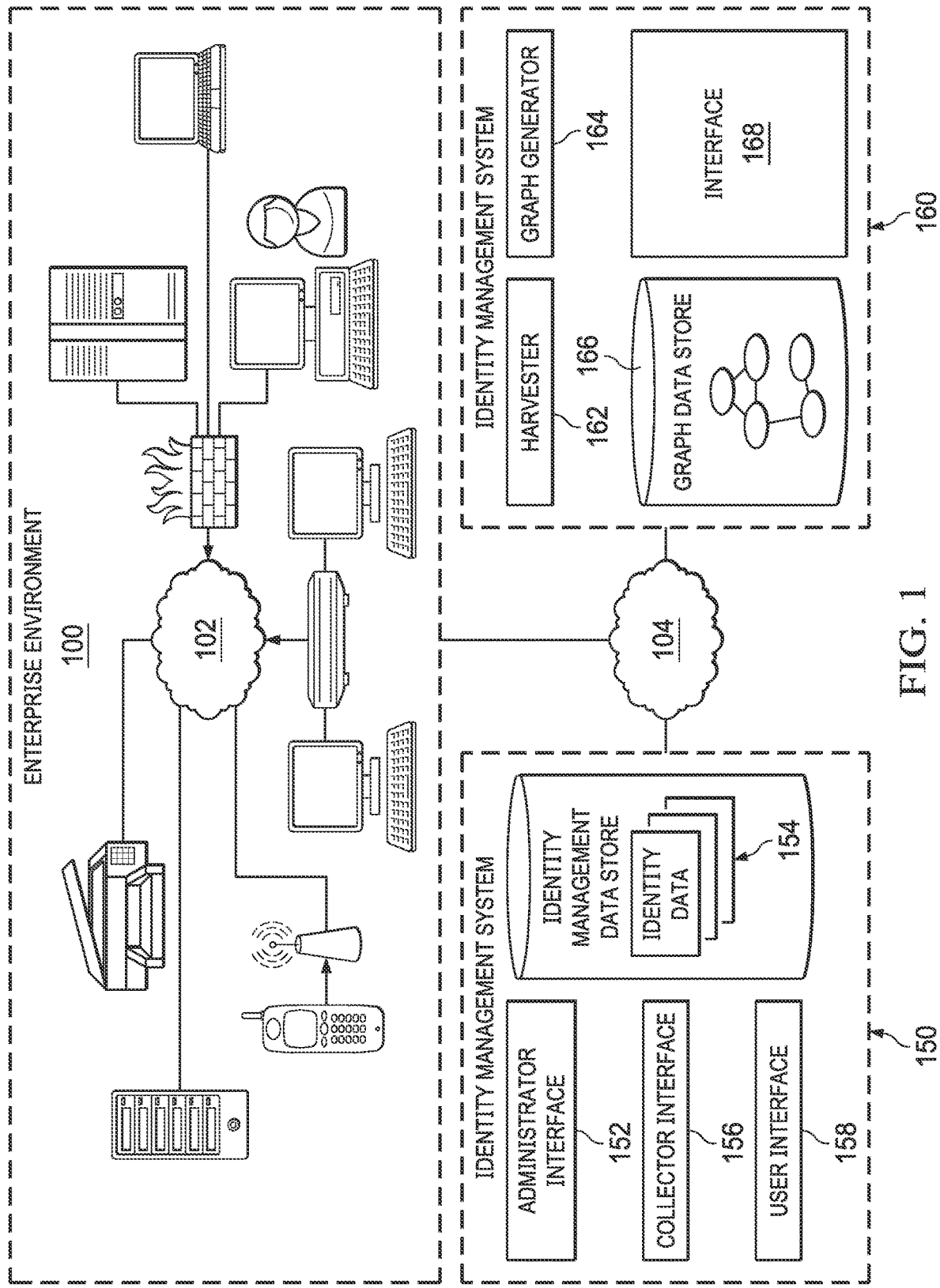
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of a function or an entity associated with an enterprise. An identity may thus represent almost physical or virtual entity, place, person or other item that an enterprise would like to define. Identities can therefore represent, for example, functions or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual entity, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

To facilitate the assignment of these entitlements, enterprises may also be provided with the ability to define roles within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity or identities to which users within the enterprise computing environment are assigned, the entitlements which a user may be assigned (e.g., the functions or access which a user may be allowed) may be controlled. However, escalating security and privacy concerns are driving governance, access risk management, and compliance to the forefront of Identity Management. Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

With that in mind, it may be understood that good governance practice in the identity space relies on the 'social' principle that identities with strongly similar attributes should be assigned similar, if not identical, access entitlements. In the realm of identity governance and administration, this approach allows for a separation of duties and thus makes it feasible to identify, evaluate, and prioritize risks associated with privileged access. As part of a robust identity management system, it is therefore highly desirable to analyze an enterprise's data to identify potential risks. In principle, strictly enforced pre-existing governance policies should ensure that identities with strongly similar access privileges are strongly similar. It would thus be desirable to group or cluster the identities of an enterprise into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor or other person performing a compliance analysis or evaluation to quantitatively and qualitatively assess the effectiveness of any applicable pre-existing policies, or lack thereof, and how strictly they are enforced.

However, the data utilized by most identity management systems is not strictly numerical data. Often this data includes identifications of identities (e.g., alphanumeric identifiers for an identity as maintained by an identity management system) and identifications of entitlements or roles associated with those identities (e.g., alphanumeric identifiers for entitlements or roles as maintained by the identity management system). This data may also include data identifying roles (e.g., alphanumeric identifiers or labels for a role as maintained by an identity management solution) and identifications of entitlements associated with those roles (e.g., alphanumeric identifiers for the collection of entitlements associated with those roles). Clustering of this type of categorical data (e.g., for peer grouping of identities) is typically a harder task than clustering data of numerical type. In particular, clustering categorical data is particularly challenging since intuitive, geometric-based, distance measures experienced in real life, e.g., Euclidean distance, by definition, are exclusive to numerical data. A distance measure is a crucial component of any clustering algorithm as it is utilized at the lowest level to determine how similar/dissimilar two data points are.

For example, the one-hot-encoding data transform, which can convert categorical data into numerical data, does not work in these types of cases. Due to large number of entitlements, when combining the numerical, high-dimensional, one-hot encoded data with traditional geometric distances (e.g., Euclidean), distances between data points will be quite large and will make it hard, if not impossible, for a clustering algorithm to yield meaningful outputs. This is a direct mathematical outcome to the high dimensionality of the ambient space. It is a well-documented issue in data science literature, and the applicable nomenclature is "curse of dimensionality". Typical dimensionality reduction techniques (e.g., PCA, t-SNE, etc.) have been experimented with, but due to the way these clustering algorithms manipulate numerical data, the resulting transforms may manipulate the original data in ways that are not interpretable, hence not useful in this context.

Accordingly, conventional statistical clustering techniques such as K-modes, used in data-mining, combined with a pattern-finding algorithm such as Equivalence Class Transformation (ECLAT), have thus proven inadequate. Many of the reasons for the inadequacy of such typical clustering approaches have to do with the computationally intensive nature of the computer implementations of such methods, which are both computationally and memory intensive, reducing or hindering the performance and responsiveness of identity management systems that utilize such clustering approaches.

Attempts to remedy these problems by altering the clustering to discard or ignore less popular identities or entitlements to enhance the signal-to-noise ratio in their application have been less than successful, achieving neither adequate results in the clusters determined or in improving the performance or memory usage of systems which employ such clustering. Other workarounds for these deficiencies have also proven unworkable to this type of identity and entitlement data.

Moreover, when attempting to cluster based on categorical data, typical clustering algorithms do not capture the social aspects of identity governance. Homophily in social networks, as defined in social sciences, is the tendency of individuals to associate and bond with similar others. In identity governance, homophily in the identity space usually results as a consequence of enforcing the governance principle that similar identities should be assigned similar access entitlements. It is thus important to attempt to capture, or otherwise utilize this homophily, when peer grouping for identity management. As a consequence of all these deficiencies, the results from prior approach to identity clustering in the context of identity management were harder to interpret, yielding fewer insights, and negatively impacting the performance, efficiency, and overall quality of identity management systems. The data-driven clustering approach of identities into peer groups remains, however, a crucial component of identity management in a distributed and networked computing environment for a variety of reasons, including the usefulness of reviewing and visualizing such clusters of identities for auditing and compliance purposes.

Accordingly, to ameliorate these issues, among other ends, embodiments of the identity management systems disclosed herein may utilize a network graph approach to peer grouping of identities and entitlements of distributed networked enterprise computing environment. Specifically, in certain embodiments, data on the identities and the respective entitlements assigned to each identity (or other identity management data) as utilized in an enterprise computer environment may be obtained by an identity management system. Using the identity and entitlement data, then, a network identity graph may be constructed, where the nodes of the graph correspond to, and represent, each of the identities or entitlements. Each edge (or relationship) of the graph may join two nodes of the graph and be associated with a similarity weight representing a degree of similarity between the identities or entitlements of the respective nodes. The identity graph may then be pruned to remove weak edges (e.g., those edges whose similarity weight may fall below a pruning threshold). The pruned identity graph can then be clustered into peer groups of identities or entitlement groups, or other groups of identity management artifacts (e.g., using a graph based community detection algorithm). These peer groups of identities (or entitlements) can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities or entitlements (or other identity management artifacts) may be optimized based on a peer group assessment metric, such as, for example, graph modularity determined based on the identity graph or the determined peer groups. For instance, in one embodiment, if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities or entitlements and a peer group assessment metric determined based on the newly pruned identity graph or the newly determined peer groups. If this new peer assessment metric is now above (or below) the quality threshold the feedback loop may stop and these peer groups of identities or entitlements can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups of identities or entitlements resulting from the clustering) may more accurately reflect particular requirements or the needs of a particular enterprise or be better tailored to a particular use.

Embodiments may thus provide a number of advantages including allowing more intuitive access to the data (e.g., via graph database querying, or via graph visualization techniques), which may, in turn, yield deeper and more relevant insights for users of identity management systems. Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments. Likewise, embodiments may be dynamic with respect to time, allowing the development update processes using deltas between snapshots of data collection, bringing down operational costs and improving the performance and robustness of embodiments. Moreover, the graph format used by certain embodiments, allows the translation of domain and enterprise specific concepts, phenomena, and issues into tangible, quantifiable, and verifiable hypotheses which may be examine or validated with graph based algorithms. Accordingly, embodiments may be especially useful in assessing risk and in compliance with security policies or the like.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities, one or more entitlements, one or more roles, etc. and associate defined identities with entitlements using, for example, an administrator interface 152. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a capacity, groups, processes, physical locations, individual users or humans or almost any other physical or virtual entity, place, person or other item. An entitlement may be an item (e.g., token) that upon granting to a user will allow the user to acquire a certain account or privileged access level that enables the user to perform a certain function within the distributed networked enterprise computer environment 100. Thought of another way, an entitlement may be a specific permission granted within a computer system, such as access to a particular building (based on a user's key badge), access to files and folders, or access to certain parts of websites. Entitlements may also define the actions a user can take against the items they have access to, including, for example, accessing computing systems, applications, file systems, particular data or data items, networks, subnetworks or network locations, etc. Each of these identities may therefore be assigned zero or more entitlements with respect to the distributed networked computer environments.

To facilitate the assignment of these entitlements, enterprises may also be provided with the ability to define roles through the identity management system 150. A role within the context of the identity management system 150 may be a collection of entitlements. These roles may be assigned a name or identifiers (e.g., manager_1, engineer_level_2, team leader) by an enterprise that designate the type of user or identity that should be assigned such a role. By assigning a role to an identity using the identity management system 150, the identity may be assigned the corresponding collection of entitlements associated with the assigned role.

The identity management system 150 may thus store identity management data 154. The identity management data 154 stored may include a set entries, each entry corresponding to and including an identity (e.g., alphanumerical identifiers for identities) as defined and managed by the identity management system, a list or vector of entitlements or roles assigned to that identity by the identity management system, and a time stamp at which the identity management data was collected from the identity management system. Other data could also be associated with each identity, including data that may be provided from other systems such as a title, location or department associated with the identity. The set of entries may also include entries corresponding to roles, where each entry for a role may include the role identifier (e.g., alphanumerical identifier or name for the role) and a list or vector of the entitlements associated with each role. Other data could also be associated with each role, such as a title, location or department associated with the role.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, roles, entitlements, events or generally perform identity management with respect to enterprise environment 100.

As part of a robust identity management system, it is desirable to analyze the identity management data 154 associated with an enterprise 100. Specifically, It is desirable to group or cluster the identities or entitlements of an enterprise 100 into peer groups such that, for example, the identities in a peer group are similar with respect to the set of entitlements assigned to the identities of that group (e.g., relative to other identities or other groups) or, to determine peer groups of entitlements such that entitlement patterns and assignment may be determined and role mining performed.

Peer grouping of the identities within an enterprise (or viewing the peer groups of identities) may allow, for example, an auditor other person performing a compliance analysis or evaluation to quantitatively and qualitatively assess the effectiveness of any applicable pre-existing policies, or lack thereof, and how strictly they are enforced. Similarly, peer grouping of entitlements may allow roles to be determined from such entitlement groups and outlier entitlements to be identified. This information may, in turn, be utilized to redefine or govern existing roles as defined in the identity management system 150 and allow users of the identity management system 150 greater visibility into the roles of the enterprise 100.

Accordingly, an identity management system 160 may include a harvester 162 and a graph generator 164. The harvester 162 may obtain identity management data from one or more identity management systems 150 associated with enterprise 100. The identity management data may be obtained, for example, as part of a regular collection or harvesting process performed at some regular interval by connecting to, and requesting the identity management data from, the identity management system 150. The identity management data stored may thus include a set entries, each entry corresponding to and including an identity as defined and managed by the identity management system, a list or vector of entitlements or roles assigned to that identity by the identity management system, and a time stamp at which the identity management data was collected from the identity management system 150. The identity management data may also include a set entries for roles, each entry corresponding to and including a role as defined and managed by the identity management system 150 and a list or vector of entitlements assigned to that role by the identity management system 150, and a time stamp at which that identity management data was collected from the identity management system 150.

Graph generator 164 may generate a peer grouped identity graph from the obtained identity management data. Specifically, in one embodiment, a property (identity) graph may be generated from the identity management data obtained from the enterprise. Each of the identities and entitlements from the most recently obtained identity management data may be determined and a node of the graph created for each identity and entitlement. An edge is constructed between every pair of nodes (e.g., identities) that shares at least one entitlement and between every pair of nodes (e.g., entitlements) that shares at least one identity. Each edge of the graph may also be associated with a similarity weight representing a degree of similarity between the identities of the respective nodes joined by that edge, or between the entitlements of the respective nodes joined by that edge. It will be noted here that while a similarity weight may be utilized on edges between both identity nodes and entitlement nodes, the similarity weight type, determination and value may be determined differently based upon the respective type of node(s) being joined that weighted edge. Accordingly, the obtained identity management data may be represented by an identity graph (e.g., per enterprise) and stored in graph data store 166. These graphs may be stored or versioned such that one or more previously generated graphs may be also stored in graph data store 166 or can be generated from a graph currently stored in graph data store 166.

Once the identity graph is generated by the graph generator 164, the graph may then be pruned to remove edges based on their weighting. Again, the pruning of edges between identity nodes and entitlements nodes may be accomplished in the same, or a different manner. For example, a pruning threshold utilized to prune edges between identity nodes may be different than a pruning threshold utilized to prune edges between entitlement nodes as well as across customers.

The pruned identity graph can then be used to cluster the identities into peer groups of identities or to cluster the entitlements into peer groups of entitlements. It will also be noted here, that while identities and entitlements are discussed herein as examples of identity management artifacts that are represented as nodes in the graph, as discussed above, other identity management artifacts (e.g., roles, groups, etc.) may also be represented as nodes in the identity graph, and may be similar clustered or grouped into peer groups.

This clustering may be accomplished, for example, using a community-detection algorithm. This clustering result may also be optimized by the graph generator 164 through the use of a feedback loop to optimize the pruning of the edges until a desired metric for assessing the quality of the peer groups generated exceeds a desired threshold or satisfies certain (e.g., optimization or other) criteria. It will be noted here as well, that while the peer grouping of both identities or entitlements may be determined in embodiments, the peer grouping may be accomplished in the same or different manners for identities and entitlements in different embodiments. For example, the community detection, optimization, feedback loop or quality assessment metric may all be the same or different when clustering the identity or entitlements of the entitlement graph. More generally, then, the pruning and clustering of the identity nodes of the identity graph may be performed separately from the pruning and clustering of the entitlement nodes of the identity graph. Accordingly, the property graph may comprise at least two subgraphs, the identities subgraph comprising at least the identity nodes and edges between these identity nodes and the entitlement subgraph comprising at least the entitlement nodes and edges between those entitlement nodes. Other subgraphs are also possible, including role subgraphs, group subgraphs, etc. It should be noted here that while embodiments may be discussed with respect to specific subgraphs or type of graph (e.g., identity graphs or entitlement graphs, etc.), it should be understood that these embodiments apply to the property graph generally and each of the subgraphs that may be determined from such a property graph, without loss of generality.

Once the peer groups of identities or entitlements (or other identity management artifacts) are determined, the peer groups can then be stored (e.g., separately or in the property graph itself) and used by the identity management system 160. For example, each peer group of identities (also referred to herein as an identity group) may be assigned a peer group identifier and the peer group identifier associated with each identity assigned to the peer group by storing the peer group identifier in association with the node in the graph representing that identity. Similarly, each peer group of entitlements (e.g., also referred to herein as an entitlement group) may be assigned a peer group identifier and the peer group identifier associated with each entitlement assigned to the peer group by storing the peer group identifier in association with the node in the graph representing that entitlement.

An interface 168 of the identity management system 160 may use the identity graph in the graph data store 166 or associated peer groups to present one or more interface which may be used for risk assessment, as will be discussed. For example, an interface 168 may present a visual representation of the graph, the identities, entitlements, or the peer groups in the identity graph to a user of the identity management system 160 associated with enterprise 100 to assist in compliance or certification assessments or evaluation of the identities, entitlements or roles as currently used by the enterprise (e.g., as represented in identity management data 154 of identity management system 150).

Before moving on, it will be noted here that while identity management system 160 and identity management system 150 have been depicted separately for purposes of explanation and illustration, it will be apparent that the functionality of identity management systems 150, 160 may be combined into a single or a plurality of identity management system as is desired for a particular embodiment and the depiction and separation of the identity management systems and their respective functionality has been depicted separately solely for purposes of ease of depiction and description.

Figure 2:
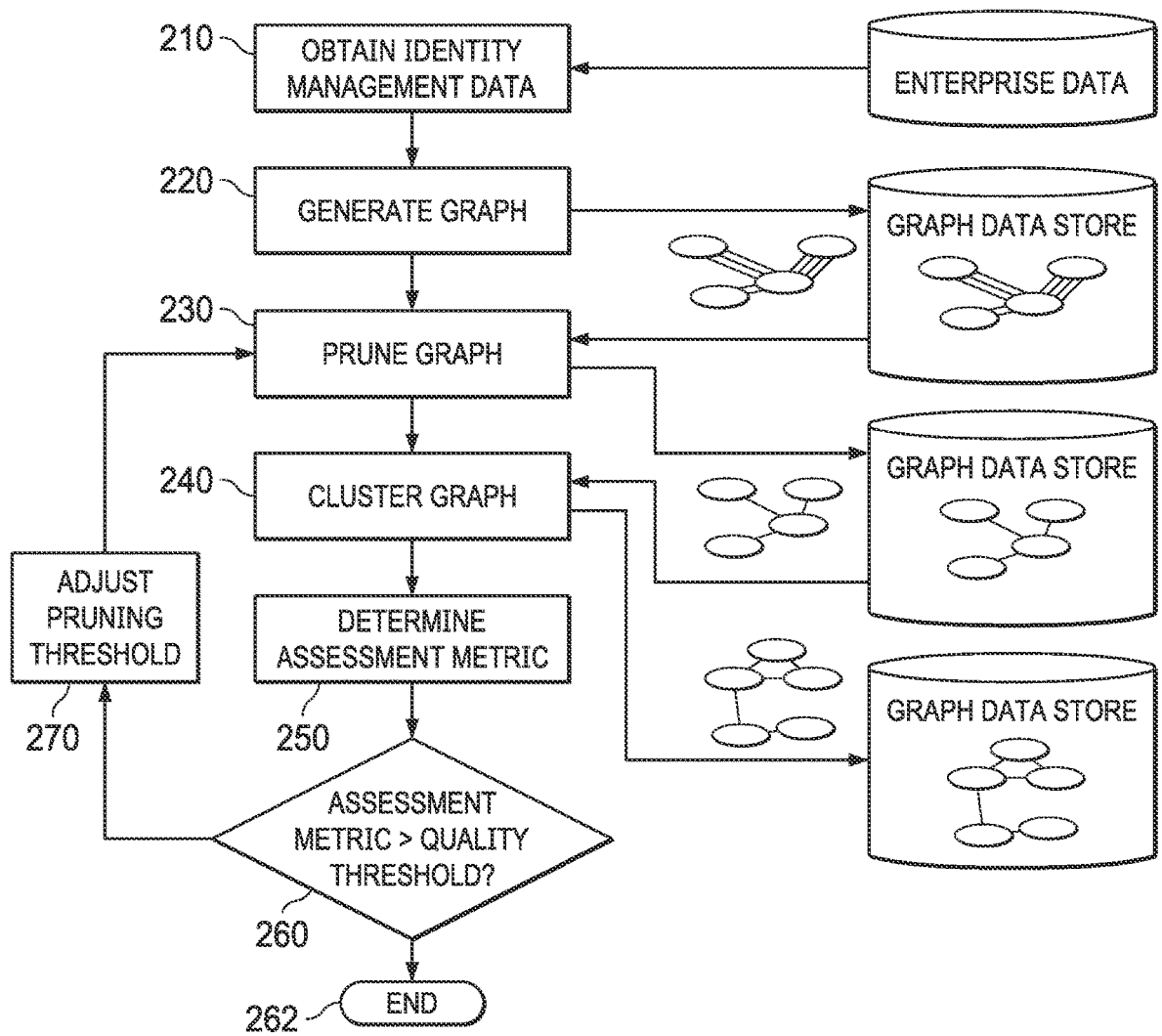
FIG. 2 is a flow diagram of one embodiment of a method for peer group detection and analysis using cluster based analysis of identity graphs.

Turning now to FIG. 2, a flow diagram for one embodiment of a method for determining peer groups of identities using a graph database is depicted. Embodiments of such a method may be employed by graph generators of identity management systems to generate identity graphs and associated peer groups from identity management data, as discussed above. It will be noted here, that while this embodiment is described in association with the determination of peer groups of identities in the identity graph, similar embodiments may be applied to entitlement nodes and associated similarity relationships of an identity graph to determine peer groups of entitlements in such an identity graph.

Initially, at step 210, identity management data may be obtained. As discussed, in one embodiment, this identity management data may be obtained from one or more identity management systems that are deployed in association with an enterprise's distributed computing environment. Thus, the identity management data may be obtained, for example, as part of a regular collection or harvesting process performed at some regular interval by connecting to, requesting the identity management data from, an identity management system. The identity management data may also be obtained on a one-time or user initiated basis.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same times stamp can thus be thought of as a snapshot from that time of the identities and entitlements of the enterprise computing environment as management by the identity management system.

As an example of identity management data that may be obtained from an identity management system, the following is one example of a JavaScript Object Notation (JSON) object that may relate to an identity:

```
{
    "attributes": {
        "Department": "Finance",
        "costcenter": "[R01e, L03]",
        "displayName": "Catherine Simmons",
        "email": "Catherine.Simmons@demoexample.com",
        "empId": "1b2c3d",
        "firstname": "Catherine",
        "inactive": "false",
        "jobtitle": "Treasury Analyst",
        "lastname": "Simmons",
        "location": "London",
        "manager": "Amanda.Ross",
        "region": "Europe",
        "riskScore": 528,
        "startDate": "12/31/2016 00:00:00AM UTC",
        "nativeIdentity_source_2": "source_2",
        "awesome_attribute_source_1": "source_1",
        "twin_attribute_a": "twin a",
        "twin_attribute_b": "twin b",
        "twin_attribute_c": "twin c"
    },
```

-continued

```
    "id": "2c9084ee5a8de328015a8de370100082"
    "integration_id": "iiq",
    "customer_id": "ida-bali",
    "meta": {
        "created": "2017-03-02T07:19:37.233Z",
        "modified": "2017-03-02T07:24:12.024Z"
    },
    "name": "Catherine.Simmons",
    "refs": {
        "accounts": {
            "id": [
                "2c9084ee5a8de328015a8de370110083"
            ],
            "type": "account"
        },
        "entitlements": {
            "id": [
                "2c9084ee5a8de328015a8de449060e54",
                "2c9084ee5a8de328015a8de449060e55"
            ],
            "type": "entitlement"
        },
        "manager": {
            "id": [
                "2c9084ee5a8de022015a8de0c52b031d"
            ],
            "type": "identity"
        }
    },
    "type": "identity"
}
```

As another example of identity management data that may be obtained from an identity management system, the following is one example of a JSON object that may relate to an entitlement:

```
{
    "integration_id": "bd992e37-bbe7-45ae-bbbf-c97a59194cbc",
    "refs": {
        "application": {
            "id": [
                "2c948083616ca13a01616ca1d4aa0301"
            ],
            "type": "application"
        }
    },
    "meta": {
        "created": "2018-02-06T19:40:08.005Z",
        "modified": "2018-02-06T19:40:08.018Z"
    },
    "name": "Domain Administrators",
    "attributes": {
        "description": "Domain Administrators group on Active Directory"
        "attribute": "memberOf",
        "aggregated": true,
        "requestable": true,
        "type": "group",
        "value": "cn=Domain Administrators,dc=domain,dc=local"
    },
    "id": "2c948083616ca13a01616ca1f1c50377",
    "type": "entitlement",
    "customer_id": "3a60b474-4f43-4523-83d1-eb0fd571828f"
}
```

At step 220 an identity graph may be generated from the identity management data obtained from the enterprise. Specifically, each of the identities and entitlements from the most recent snapshot of identity management data may be obtained and a node of the graph created for each identity and entitlement. An edge is constructed between every pair of identity nodes (e.g., identities) that shares at least one entitlement (e.g., an edge connects two identity nodes if and only if they have at least one entitlement in common). An edge may also be constructed between every pair of entitlement nodes (e.g., entitlements) that shares at least one identity (e.g., an edge connects two entitlement nodes if and only if they have at least one identity in common).

Each edge of the graph joining identity nodes or entitlement nodes may be associated with a similarity weight representing a degree of similarity between the identities or entitlements of the respective nodes joined by that edge. For identity nodes, the similarity weight of an edge joining the two identity nodes may be generated based on the number of entitlements shared between the two joined nodes. As but one example, the similarity weight could be based on a count of the similarity (e.g., overlap or intersection of entitlements) between the two identities divided by the union of entitlements. Similarly, for identity nodes, the similarity weight of an edge joining the two entitlement nodes may be generated based on the number of identities shared between the two joined nodes. As but one example, the similarity weight could be based on a count of the similarity (e.g., overlap or intersection of identities) between the two entitlements divided by the union of identities. For instance, the similarity could be defined as the ratio between a number of identities having both entitlements joined by the edge to the number of identities that have either one (e.g., including both) of the two entitlements.

In one embodiment, the edges are weighted via a proper similarity function (e.g., Jaccard similarity). In one embodiment, a dissimilarity measure, of entitlement or identity binary vectors, d, may be chosen, then the induced similarity, $1-d(x,y)$, may be used to assign a similarity weight to the edge joining the nodes, x,y. Other methods for determining a similarity weight between two nodes are possible and are fully contemplated herein. Moreover, it will be noted here that while a similarity weight may be utilized on edges between both identity nodes and entitlement nodes, the similarity weight type, determination and value may be determined differently based upon the respective type of node(s) being joined that weighted edge.

In one specific, embodiment, a symmetric matrix for identities (e.g., an identity adjacency matrix) may be determined with each of the identities along each axis of the matrix. The diagonal of the matrix may be all 0s while the rest of values are the similarity weights determined between the two (identity) nodes on the axes corresponding to the value. In this manner, this symmetric matrix may be provided to a graph constructor which translates the identities on the axes and the similarity values of the matrix into graph store commands to construct the identity graph. Similarly, a symmetric matrix for entitlements (e.g., an entitlement adjacency matrix) may be determined with each of the entitlements along each axis of the matrix. The diagonal of the matrix may be all 0s while the rest of values are the similarity weights determined between the two (entitlement) nodes on the axes corresponding to the value. In this manner, this symmetric matrix may be provided to a graph constructor which translates the entitlement on the axes and the similarity values of the matrix into graph store commands to construct the identity graph.

Accordingly, the identity management data may be faithfully represented by a graph, with k types of entities (nodes/vertices, e.g., identity-id, title, location, entitlement, etc.) and stored in a graph data store. It will be noted that the graph data store may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

Once the identity graph is generated, the graph may then be pruned at step 230. Here, the identity graph may be pruned to remove weak edges (e.g., those edges whose similarity weight may fall below a pruning threshold). The pruning of the graph is associated with the locality aspect of identity governance, where an identity's access entitlements should not be directly impacted, if at all, by another identity with strongly dissimilar entitlement pattern (e.g., a weak connecting edge) or that determined should be based on strong commonality or popularity of entitlements within an identity grouping. Accordingly, the removal of such edges may not dramatically alter the global topology of the identity graph. An initial pruning threshold may be initially set or determined (e.g., as 50% similarity or the like) and may be substantially optimized or otherwise adjusted at a later point. As another example, a histogram of similarity weights may be constructed and a similarity weight corresponding to a gap in the similarity weights of the histogram may be chosen as an initial pruning threshold. Again, the pruning of edges between identity nodes and entitlements nodes may be accomplished in the same, or a different manner. For example, the pruning threshold utilized to prune edges between identity nodes may be different than a pruning threshold utilized to prune edges between entitlement nodes.

The pruned identity graph can then be used to cluster the identities or entitlements into peer groups of identities or peer groups of entitlements at step 240. Within this graph approach, a representation of a peer group of identities could be represented by a maximal clique, where every identity is strongly connected (e.g., similar) to every other identity within the identity peer group, and consequently, members of the clique all share a relatively large, and hence dominant, common core of entitlements. A representation of an entitlement peer group could be represented by a maximal clique, where every entitlement is strongly connected (e.g., similar) to every other entitlement within the peer group, and consequently, members of the clique all share a relatively large, and hence dominant, common core of identities. The problem of finding all maximal cliques of a graph may, however, be a memory and computationally intensive problem. Most clique related problems in graph theory are hard and some of them are even NP-complete, requiring exponential time to finish as graphs with exponentially many maximal cliques may exist.

Accordingly, in one embodiment a community-detection algorithm may be utilized for peer grouping the identities or entitlements of the identity graph to speed the determination of the peer groups, reduce computational overhead and conserve memory, among other advantages. A plethora of applicable and performant community-detection and graph clustering algorithms may be utilized according to certain embodiments. Some of these algorithms are specifically targeted to large graphs, which can be loosely described as graphs with at least tens or hundreds (or more) of thousands of nodes and millions of edges. Such graph community-detection algorithms may include, for example, Louvain, Leiden, Fast-greedy, Label Propagation or Stochastic Block Modeling. Other graph community detection algorithms may be utilized and are fully contemplated herein.

In certain embodiments, a clustering result may be optimized through the use of a feedback loop, as discussed below. As such, in one embodiment it may be desirable to utilize a community-detection algorithm for determination of the peer groups that may provide or allow a straightforward determination of a peer group assessment metric for a quality assessment of determined peer groups or the identity graph. Accordingly, a community-detection algorithm that may be based on, or allow a determination of, a graph based metric (e.g., modularity, evolving topology, connected components, centrality measures (e.g., betweenness, closeness, community overlap measures such as NMI or Omega indices)) that may be used as a peer group assessment metric may be utilized.

Specifically, in one embodiment, the Louvain algorithm may be utilized as a community-detection algorithm and modularity may be used as a peer assessment metric. The Louvain algorithm may not only be a scalable algorithm that can handle, and be efficient on, large graphs; but additionally, the Louvain algorithm may be based on modularity or be modularity optimized. Modularity is a scalar that can be determined for a graph or groups or subgraphs thereof. This modularity reflects a likelihood of the clusters generated (e.g., by the algorithm) to not have been generated by random chance. A high modularity value, (e.g., positive and away from 0) may indicate that the clustering result is unlikely to be a product of chance. This modularity can thus be used as a peer group assessment metric.

Moreover, in addition to the application of a peer group assessment metric to optimize the peer groups or identity graphs determined using such community-detection algorithms, an identity management system may employ alerts based these peer group assessment metrics. For example, an alert to a user may be based on an alert threshold (e.g., if the peer group assessment metric drops below or above a certain threshold) or if any changes over a certain threshold occur with respect to the peer group assessment metric. For example, setting an empirical low threshold for modularity, with combined user alerts, could serve as a warning for deteriorating quality of peer groups or the identity graph. This could be due to input data has been corrupted at some point in pipeline, or in other cases, that the access entitlement process for the particular enterprise is extremely lacking due discipline. Regardless of the underlying cause, such an early warning system may be valuable to stop the propagation of questionable data quality in the peer group assessment and determination process and more generally to identity management goals within the enterprise.

In many cases, the community-detection or other clustering algorithm utilized in an embodiment may fall under the umbrella of what are usually termed unsupervised machine-learning. Results of these types of unsupervised learning algorithms may leave some room for interpretation, and do not, necessarily or inherently, provide outputs that are optimized when the domain or context in which they are being applied are taken into account. Consequently, to mitigate some of these issues and to optimize the use of the peer groups and identity graphs in an identity governance context, embodiments of identity management systems employing such peer groups of identities or entitlements using an identity graph may allow some degree of user configuration, where at a least a portion of the user configuration may be applied in the graph determination, peer-grouping or optimization of such peer group determination.

This configurability may allow the user of an identity management system to, for example, impose some constraints or set up certain configuration parameters for the community-detection (or other peer grouping) algorithm in order to enhance the clustering results for a particular use-case or application. A few non-exhaustive examples of user configuration are thus presented. A user may have a strongly defined concept of what constitutes a 'peer'. This may entail that the user's specification of what continues a peer may be used to derive a pruning threshold with statistical methods (e.g., rather than relying on modularity).

As another example of configurability, a user may elect to opt for a hierarchical clustering output, or that peer groups should have certain average size, which may entail to allowing for several consecutive iterations of the community-detection algorithm to be performed (as will be explained in more detail herein). A user may also elect to run the peer grouping per certain portions of the identities or entitlements, versus running it for all identities or entitlements. The filtered population of identities or entitlements may be specified in terms of geographic location, business role, business unit, etc. Similarly, a user may elect to filter the outputs of the community-detection algorithm in terms of certain identity or entitlement attributes, e.g., identity role, identity title, identity location, etc. The results might then be quantitatively and qualitatively contrasted against existing governance policies to measure, assess and certify compliance with these policies.

Generally then, a user may elect to utilize the peer grouping feature in combination with other tools of identity governance, in order to gain more insight into the quality of identity governance policy enforcement within the business. This entails that peer grouping should be configurable and flexible enough to allow it to be paired with other (e.g., third-party) identity management tools. Accordingly, certain restrictions may be imposed on the identity graph's or peer group's size, format, level of detail, etc.

In any event, once the peer groups of identities or entitlements of the pruned identity graph are used to cluster the identities into peer groups of identities at step 240 the determined peer groups can then be stored (e.g., separately or in the identity graph itself) and used by the identity management system. For example, each peer group (e.g., or identities or entitlements) may be assigned a peer group identifier and the peer group identifier associated with each identity assigned to the peer group by storing the peer group identifier in association with the node in the graph representing that identity or entitlement.

As an example of use a visual representation of the graph, the identities, entitlements or the peer groups in the identity graph may be presented to a user of the identity management to assist in compliance or certification assessments or evaluation of the identities and entitlements as currently used by the enterprise. In principle, strictly enforced pre-existing governance policies should ensure that identities with strongly similar access privileges are strongly similar (e.g., are in the same peer group). The presentation of such peer groups may thus, for example, allow an auditor or compliance assessor to quantitatively and qualitatively assess the effectiveness of any applicable pre-existing policies, or lack thereof, and how strictly they are enforced.

During such collection, graph determination and peer grouping steps, in certain embodiments, a number of efficiencies may be implemented to speed the collection process, reduce the amount data that must be stored and to reduce the computer processing overhead and computing cycles associated with such data collection, graph determination and peer grouping of such data. Specifically, in one embodiment, a delta change assessment may be performed when identity management data is collected or peer groups are determined in a current time period. More specifically, if identity management data was collected in a previous time period, or a previous peer grouping has been performed on identities or entitlements of a previously created identity graph, an assessment can be made (e.g., by a data querying script or process) of the difference (or delta) between the set of identities or entitlements corresponding to the most recent previous snapshot and the set of identities or entitlements obtained in the current time period. This assessment may comprise a determination of how many changes to the identities, associated entitlements or other attributes have occurred between the time of the previous snapshot and the current snapshot (e.g., the most recently identity management data collected in the current time period).

An assessment may also be made of the difference between the peer groups determined from the most recent previous snapshot and the peer groups obtained in the current time period. This assessment may comprise a determination of how many identities or entitlements are associated with different peer groups (e.g., relative to the peer grouping of identities or entitlements determined from the previous most recent snapshot), changes to the identities or entitlements or how many new identities are associated with an established (or new) peer group.

If there are no determined changes, or the changes are below some threshold number, or are few, local, or insignificant to a large majority of existing peer groups, then no action is needed other than updating the affected identities or entitlements in the data of the previous snapshot or the identity graph. New entries in the entries comprising the current snapshot of identities or entitlements may be created for any newly identified identities or entitlements. Additionally, nodes in the graph corresponding to new identities or entitlements can be appended to an appropriate peer group based on how similar this new identity to existing peer groups, (e.g., assign the new identity the peer group of the same department/title).

If the differences (e.g., number of changes, new identities, different peer group assignments, etc.) are non-trivial, affecting a multitude of identities across peer groups, then a new peer grouping process may occur on the newly refreshed data. In such case, a detection algorithm may be used to evolve, and persist, previously determined peer groups into their recent counterparts. This can be done by monitoring certain 'marker' identities, e.g., influencers, or identities with high centrality values and/or high degree of connections, in both versions of peer groups. Utilizing a majority vote approach, it can be determined how previous peer groups evolve into newer ones. Expected updated versions of the previous peer group, include splitting, merging, growth, shrinkage. Newer split peer groups may, for example, inherit the 'old' peer group identifiers.

Embodiments of such a delta detection and updating mechanisms may have the further advantage of allowing the quality and stability of each peer group to be monitored by an identity management system via tracking the peer groups or identity graph, the changes thereto, or their evolution over time. By actively monitoring and assessing the degree of these changes between two or more consecutive versions of a peer group or identity graph, deteriorating quality issues may be detected as they arise or manifest in the identity graph or peer groups determined therefrom. Similarly, using the identity graphs, peer groups or peer group assessment metrics determined therefrom, a graph evolution model may be built in certain embodiments, (e.g., based on epidemiology susceptible, infected and recovered type models). Comparing the observed evolution of identities, entitlements or peer groups versus theoretical predictions may provide another tool to warn users of an identity management system against rapid or extreme changes that may negatively impact the quality of peer groups or identity management more generally.

Again, once the peer groups of identities or entitlements are determined from the pruned identity graph and stored (at step 240), a peer group assessment metric may be determined based on the identity graph or the determined peer groups at step 250. As discussed, this peer group assessment metric may be determined separately based on the peer groups or identity graph determined, or may be metric utilized by a community-detection algorithm, such that the peer group assessment metric may be determined as part of the peer group determination process. In certain embodiments then, the application of a community-detection algorithm may result in such a peer group assessment metric (e.g., modularity, evolving topology, connected components, centrality measures e.g., betweenness, closeness, community overlap measures (e.g., NMI, Omega indices)) that may be used as a peer group assessment metric may be utilized.

For example, as discussed above the Louvain algorithm may be a graph-based modularity optimized community-detection algorithm. Thus, a modularity associated with the determined peer groups may result from the determination of the peer group using the Louvain algorithm. Modularity is a scalar that can be determined for a graph or groups or subgraphs thereof and reflects a likelihood of the clusters generated (e.g., by the algorithm) to not have been generated by random chance. A high modularity value, (e.g., positive and away from 0) may indicate that the clustering result is unlikely to be a product of chance. This modularity can be used as a peer group assessment metric in one embodiment.

Accordingly, in certain embodiments, the clustering of identities or entitlements into peer groups may be optimized based on this peer group assessment metric. Specifically, a feedback loop may be utilized to determine the optimal pruning threshold. The optimization loop may serve to substantially increase or maximize the quality of the graph clustering, with respect to certain proper metrics (e.g., graph modularity or other peer group assessment metric). Additional domain-specific, per enterprise, criteria may be utilized in this step in certain embodiments in order to render clustering results that accurately reflect certain requirements to better serve a particular enterprise or use of the peer groups or identity graph.

For instance, in one embodiment if the peer group assessment metric is above (or below) a quality threshold at step 260 the determination of peer groups of identities or entitlements for the obtained in the current snapshot may end at step 262. The determined peer groups of identities or entitlements can then be stored (e.g., separately or in the identity graph) and used by the identity management system.

However, if the peer group assessment metric is below (or above) a quality threshold at step 260 a feedback loop may be instituted whereby the pruning threshold is adjusted by some amount at step 270 (up or down) and the originally determined identity graph is again pruned based on the adjusted pruning threshold (or the previously pruned identity graph may be further pruned) at step 230. The adjustment of the pruning threshold may be based on a wide variety of criteria in various embodiments and may be adjust be a fixed or differing amount in every iteration through the feedback loop. Additionally, in some embodiments, various machine learning techniques (e.g., unsupervised machine learning techniques such as k-means, method of moments, neural networks, etc.) may be used to determine an amount to adjust the pruning threshold or a value for the adjusted pruning threshold). This newly pruned identity graph can then be clustered into new peer groups of identities or entitlements at step 240 and a peer group assessment metric determined at step 250 based on the newly pruned identity graph or the newly determined peer groups.

If this new peer assessment metric is now above (or below) the quality threshold at step 260 the feedback loop may be stopped and the determination of peer groups of identities or entitlements for the data obtained in the current snapshot may end at step 262. These peer groups of identities or entitlements can then be stored (e.g., separately or in the identity graph) and used by the identity management system.

Otherwise, the feedback loop may continue by again adjusting the pruning threshold further at step 270 (e.g., further up or further down relative to the previous iteration of the feedback loop), re-pruning the identity graph based on the adjusted pruning threshold at step 230, clustering this newly pruned graph at step 240, determining another peer group assessment metric at step 250 and comparing this metric to the quality threshold at step 260. In this manner, the feedback loop of adjustment of the pruning threshold, re-pruning the graph and re-clustering the identity graph into peer groups may be repeated until the peer group assessment metric reaches a desired threshold. Moreover, by tailoring the peer group assessment metric and quality threshold to include or reflect domain or enterprise specific criteria (e.g., which may be specified by a user of the identity management system), the clustering results (e.g., the peer groups resulting from the clustering) may more accurately reflect particular requirements or the needs of a particular enterprise or be better tailored to a particular use.

Once the feedback loop is ended (step 262) the determined peer groups of identities or entitlements can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

It will be noted here as well, that while the peer grouping of both identities or entitlements (or other identity management artifacts, such as roles, groups, etc.) may be determined in embodiments, the peer grouping may be accomplished in the same or different manners for identities and entitlements (or other identity management artifacts) in different embodiments. For example, the community detection, optimization, feedback loop or quality assessment metric (e.g., steps 230, 240, 250, 260 and 270) may all be performed the same or differently when clustering the identity or entitlements of the entitlement graph. More generally, then, the pruning and clustering of the identity nodes of the identity graph may be performed separately from the pruning and clustering of the entitlement nodes of the identity graph. In certain embodiments, for example, the pruning and clustering (e.g., steps 230, 240, 250, 260 and 270) of the identity nodes of the identity graph may be performed as a separate process from the pruning and clustering (e.g., steps 230, 240, 250, 260 and 270) of the entitlement nodes of the identity graph. Accordingly, the identity graph may comprise at least two subgraphs, the identities subgraph comprising at least the identity nodes and edges between these identity nodes and the entitlement subgraph comprising at least the entitlement nodes and edges between those entitlement nodes.

It may now be helpful to look at such visual depictions and presentations of identity graphs or interfaces that may be created or presented based on such identity graphs. It will be apparent that these depictions and interfaces are but example of depictions and interfaces that may presented or utilized, and that almost any type of presentation, depiction or interface based on the identities, entitlements, peer groups or other associated data discussed may be utilized in association with the embodiments of identity management systems disclosed herein.

As discussed, embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity or two nodes representing an entitlement, as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities or entitlements may be determined using the weights of the relationships in the identity graph.

Specifically, in certain embodiments, a property graph may be thought of as a graph comprising a number of interrelated nodes. These nodes may include nodes that may have labels defining the type of the node (e.g., the type of "thing" or entity that the node represents, such as an identity, entitlement, role, or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarity", or the like.

The nodes of the property graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 3A:
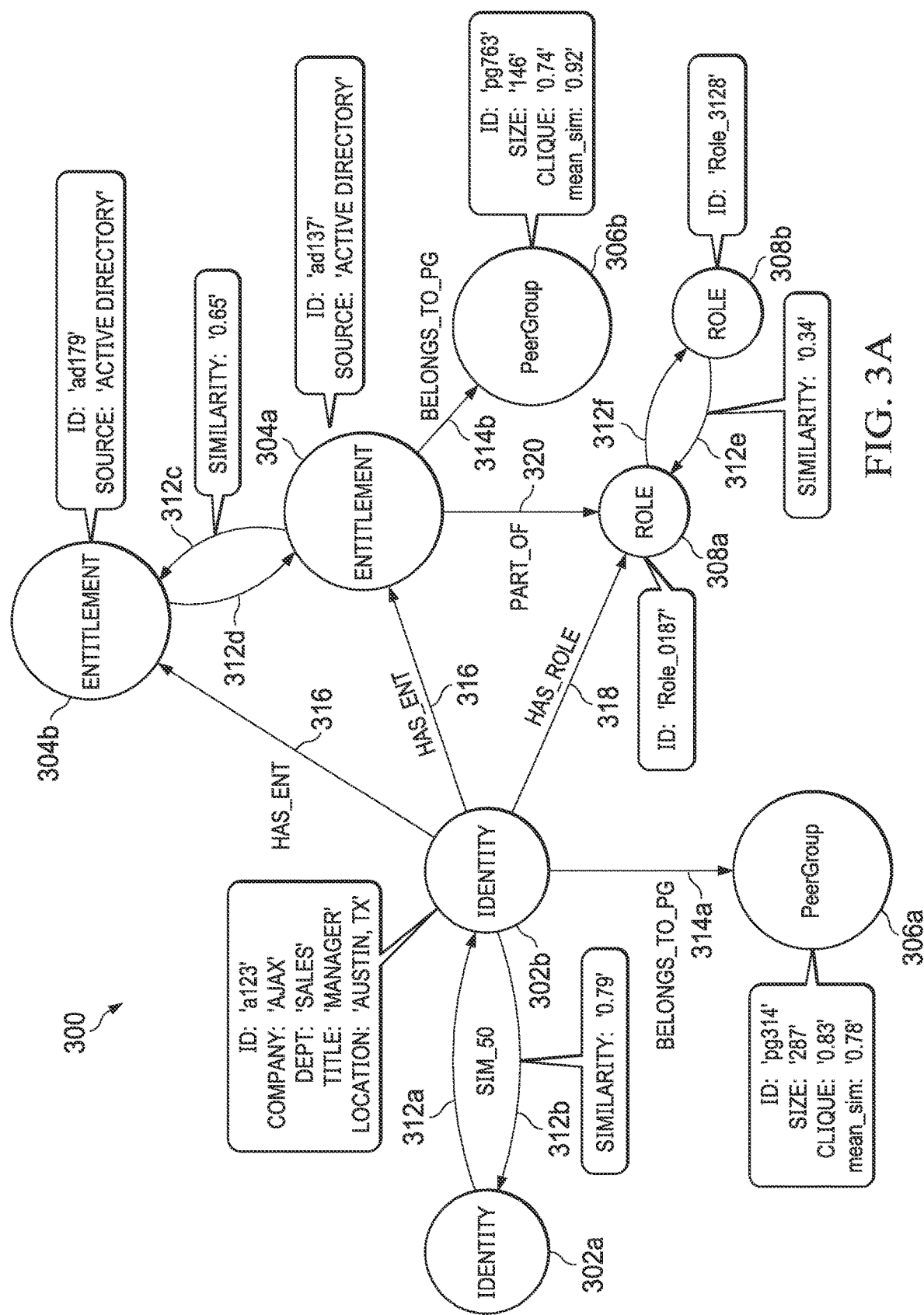

Referring then to FIG. 3A1, a graphical depiction of a portion of an example identity graph 300 is depicted. Here, nodes are represented by circles and relationships are represented by the directional arrows between the nodes. Such an identity graph 300 may represent identities, entitlements or peer groups, their association, and the degree of similarity between identities represented by the nodes. Thus, for example, the identity nodes 302a, 302b have the label "Identity" indicating they are identity nodes. Identity node 302b is shown as being associated with a set of properties that define the attributes or data of that identity node 302b, including here that the "id" of identity node 302b is "a123", the "company" of identity node 302b is "Ajax", the "dept" of identity node 302b is "Sales", the "title" of identity node 302b is "Manager", and the "location" of identity node 302b is "Austin, TX".

These identity nodes 302 of the identity graph 300 are joined by edges formed by directed relationships 312a, 312b. Directed relationship 312a may represent that the identity of identity node 302a is similar to (represented by the labeled "SIM" relationship 312a) the identity represented by identity node 302b. Similarly, directed relationship 312b may represent that the identity of identity node 302b is similar to (represented by the labeled "SIM" relationship 312b) the identity represented by identity node 302a. Here, relationship 312b has been assigned a similarity weight of 0.79. Notice that while these relationships 312a, 312b are depicted as individual directional relationships, such a similar relationship may be a single bidirectional relationship assigned a single similarity weight.

Entitlement nodes 304a, 304b have the label "Entitlement" indicating that they are entitlement nodes. Entitlement node 304a is shown as being associated with a set of properties that define the attributes or data of that entitlement node 304a, including here that the "id" of entitlement node 304 is "ad137", and the "source" of entitlement node 304a is "Active Directory". Entitlement node 304b is shown as being associated with a set of properties that define the attributes or data of that entitlement node 304b, including here that the "id" of entitlement node 304b is "ad179", and the "source" of entitlement node 304a is "Active Directory".

These entitlement nodes 304 of the identity graph 300 are joined by edges formed by directed relationships 312c, 312d. Directed relationship 312c may represent that the entitlement node 304a is similar to (represented by the labeled "SIM" relationship 312c) the entitlement represented by entitlement node 304b. Similarly, directed relationship 312d may represent that the entitlement of entitlement node 304b is similar to (represented by the labeled "SIM" relationship 312d) the entitlement represented by entitlement node 304a. Here, relationship 312c has been assigned a similarity weight of 65. Notice that while these relationships 312c, 312d are depicted as individual directional relationships, such a similar relationship may be a single bidirectional relationship assigned a single similarity weight.

Identity node 302b and entitlement nodes 304a, 304b of the identity graph 300 are joined by edges formed by directed relationships 316, 316. Directed relationships 316 may represent that the identity of identity node 302b has (represented by the labeled "HAS_ENT" relationships 316) the entitlements represented by entitlement nodes 304a, 304b.

Peer group node 306a has the label "PeerGroup" indicating that it is a peer group node. Peer group node 306a is shown as being associated with a set of properties that define the attributes or data of that peer group node 306a, including here that the "id" of peer group node 306a is "pg314", the "size" of peer group node 306a is "287", the "clique" of peer group node 306a is "0.83" and the "mean_sim" or mean similarity value of peer group node 306a is "0.78". Identity node 302b and peer group node 306a of the identity graph 300 are joined by an edge formed by directed relationship 314a. Directed relationship 314a may represent that the identity of identity node 302b belongs to (represented by the labeled "BELONGS_TO_PG" relationship 314a) the peer group represented by peer group node 306a.

Peer group node 306b has the label "PeerGroup" indicating that it is a peer group node. Peer group node 306b is shown as being associated with a set of properties that define the attributes or data of that peer group node 306b, including here that the "id" of peer group node 306b is "pg763", the "size" of peer group node 306b is "146", the "clique" of peer group node 306b is "0.74" and the "mean_sim" or mean similarity value of peer group node 306b is "0.92". Entitlement node 304a and peer group node 306b of the identity graph 300 are joined by an edge formed by directed relationship 314b. Directed relationship 314b may represent that the identity of entitlement node 304a belongs to (represented by the labeled "BELONGS_TO_PG" relationship 314b) the peer group represented by peer group node 306b.

Entitlement nodes 308a, 308b have the label "Role" indicating that they are Role nodes. Role node 308a is shown as being associated with a set of properties that define the attributes or data of that Role node 308a, including here that the "id" of entitlement node 308a is "Role_0187". Role node 308b is shown as being associated with a set of properties that define the attributes or data of that role node 308b, including here that the "id" of role node 308b is "Role_3128". Directed relationship 318 may represent that the identity of identity node 302b has (represented by the labeled "HAS_ROLE" relationship 318) the role represented by role node 308a. Directed relationship 320 may represent that the entitlement of entitlement node 304a is a part of or included in (represented by the labeled "PART_OF" relationship 320) the role represented by role node 308a.

These role nodes 308 of the identity graph 300 are joined by edges formed by directed relationships 312e, 312f. Directed relationship 312e may represent that the role represented by role node 304a is similar to the role represented by role node 304b. Similarly, directed relationship 312f may represent that the role represented by role node 308b is similar to the role represented by role node 308a. Here, relationship 312e has been assigned a similarity weight of 0.34. Again, notice that while these relationships 312e, 312f are depicted as individual directional relationships, such a similar relationship may be a single bidirectional relationship assigned a single similarity weight.

FIG. 3B is a graphical depiction of an entitlement graph and the subgraphs or clusters that may result from different pruning thresholds. In particular, entitlement graph 350 may be an initial cluster of entitlement nodes with edges having similarity weights (e.g., which may be determined as discussed) where the entitlement graph has been pruned initially and clustered according to a 0.5 pruning threshold for the similarity weight. Entitlement graph 360 is a result of pruning the entitlement graph 350 according to a higher pruning threshold of 0.8 and clustering. Here, two subgraphs 362a, 362b may result from such a pruning.

Figure 3C:
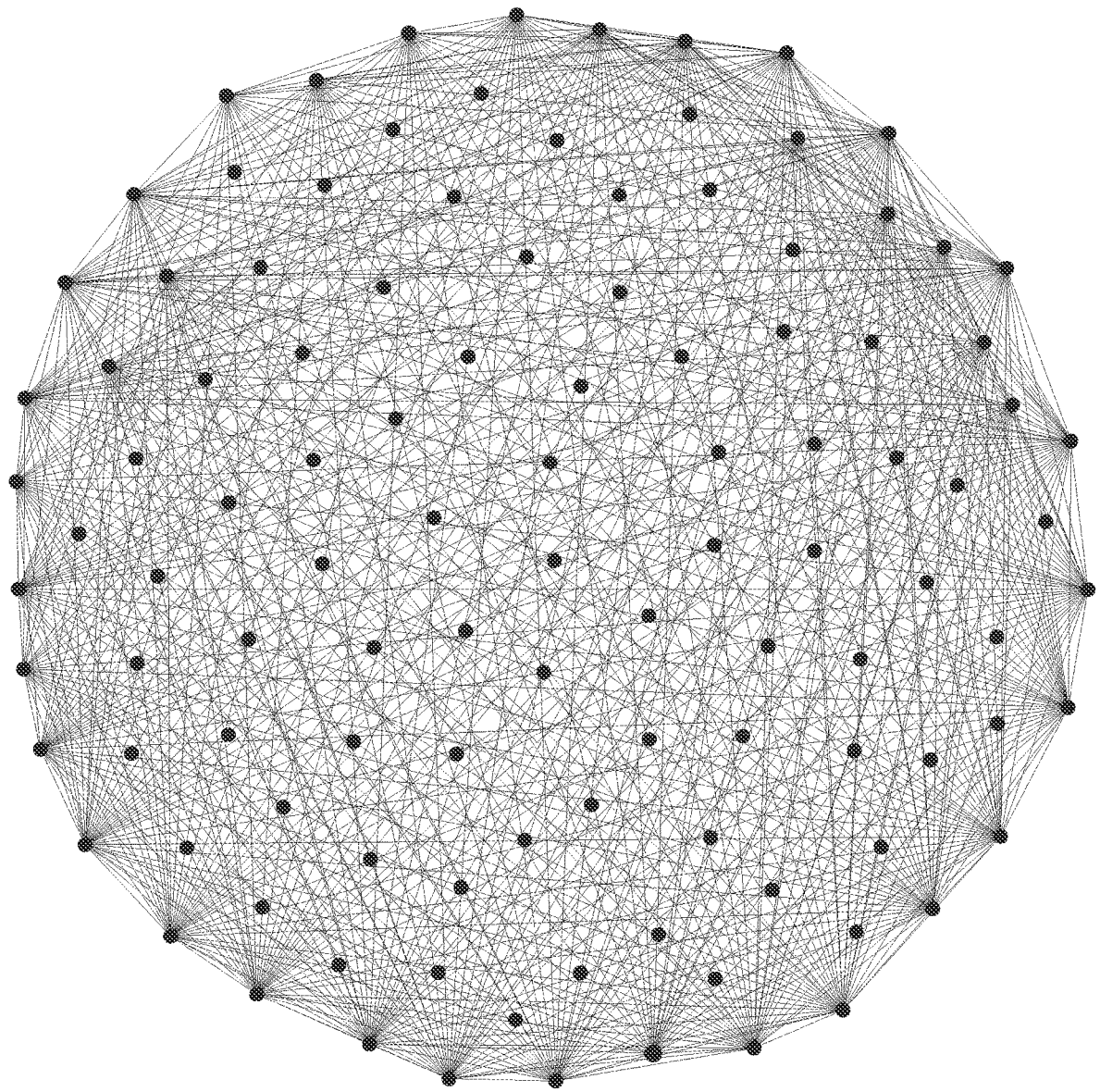
Figure 3D:
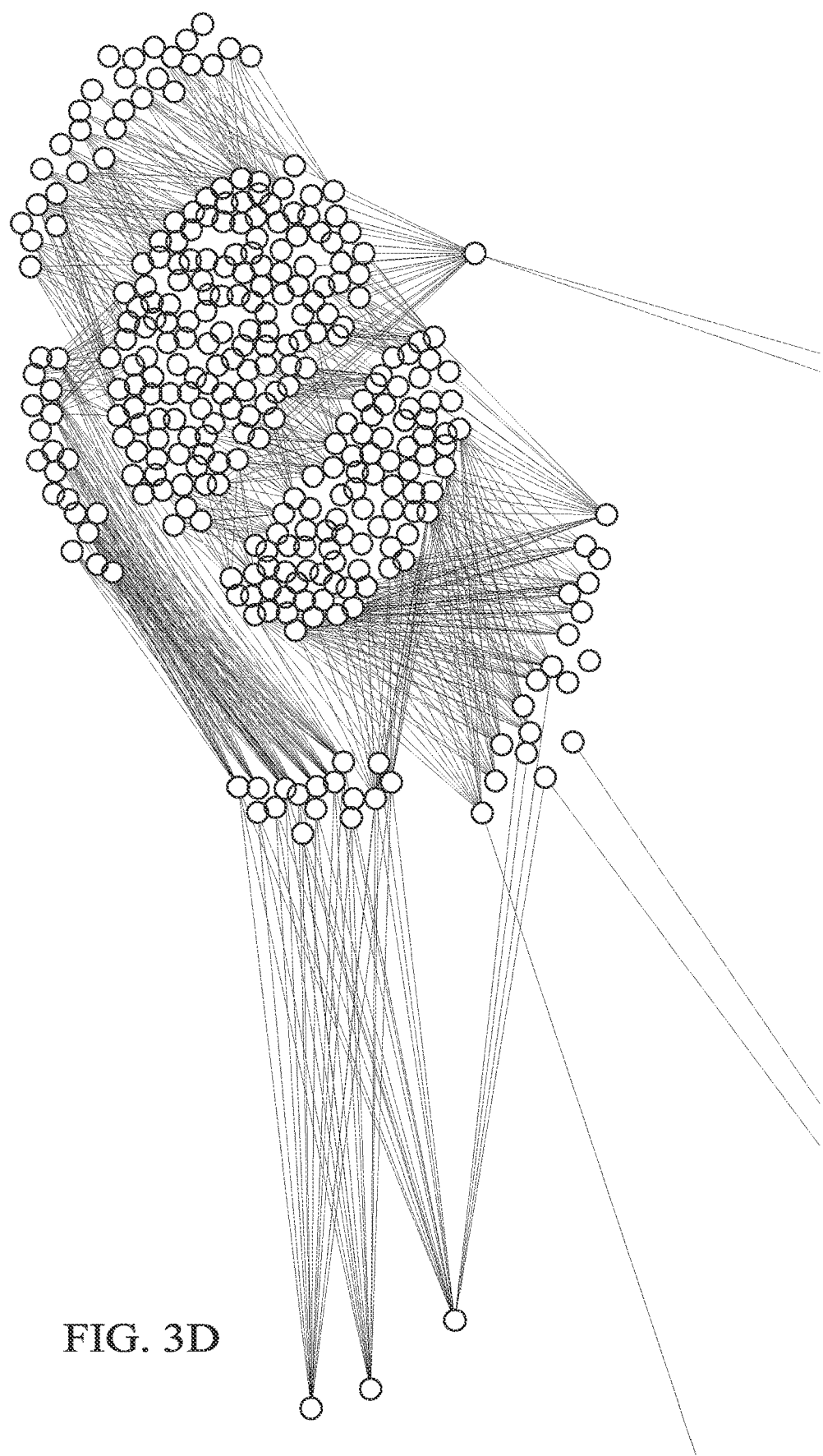
Figure 3E:
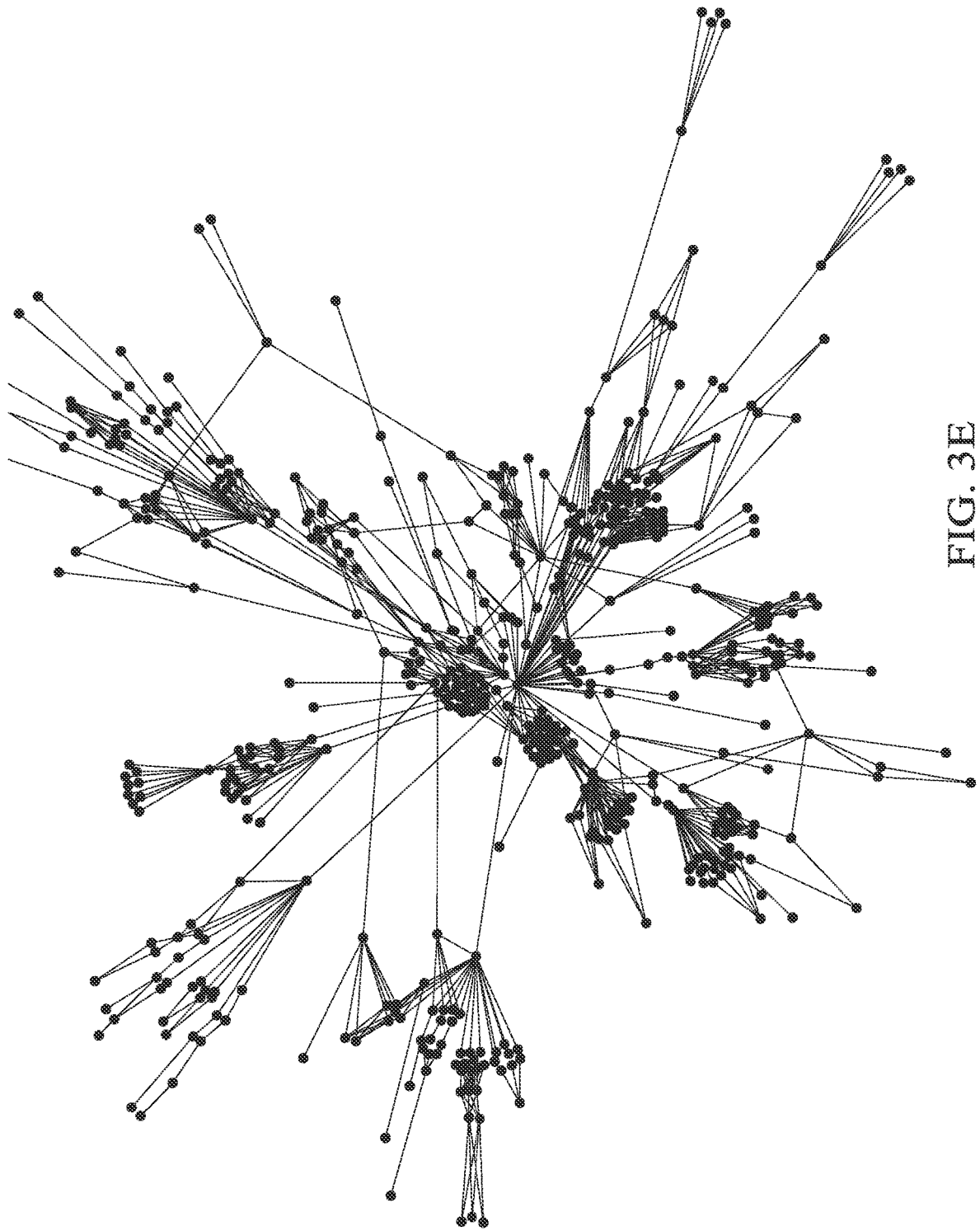

Now referring to FIGS. 3C, 3D and 3E, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing.

Figure 4:
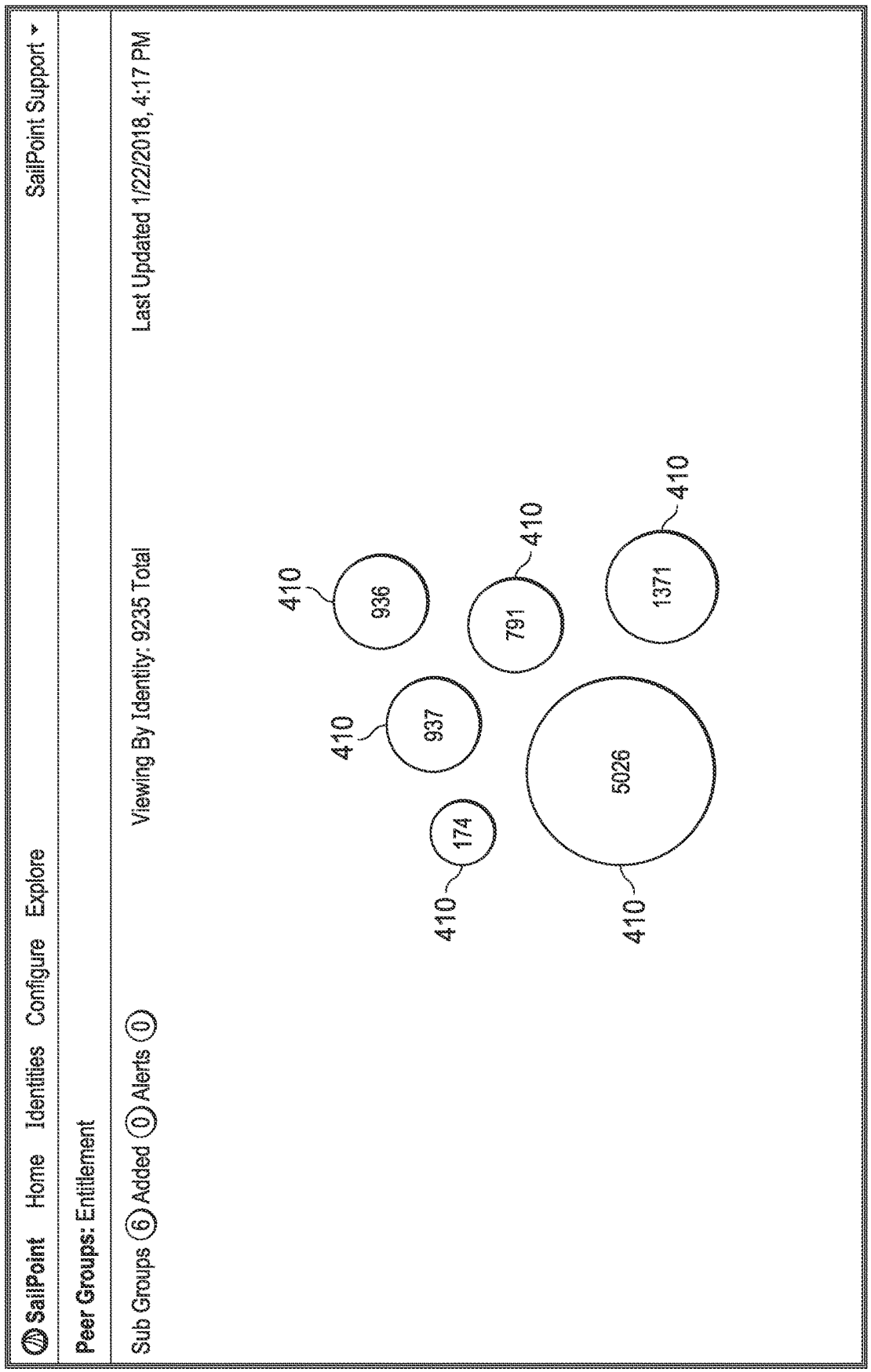
FIGS. 4-7 depict interfaces that may be utilized by embodiments of an identity management system.

FIG. 4 depicts an embodiment of an interface that may be utilized by an identity management system to visually present data regarding the peer groups determined for identities within an enterprise. In this example, the enterprise has 9235 associated identities, and the interface depicts that there are 6 peer groups of those identities that have been determined based on the entitlements associated with the identities. Each of the depicted circles 410 within the interface represents one of the peer groups and displays the number of identities associated with each of those peer groups. Moreover, the size and location of each circle 410 may depict the relative size of the peer groups of the identities and the number of entitlements shared between those peer groups, or identities within those peer groups.

Figure 5:
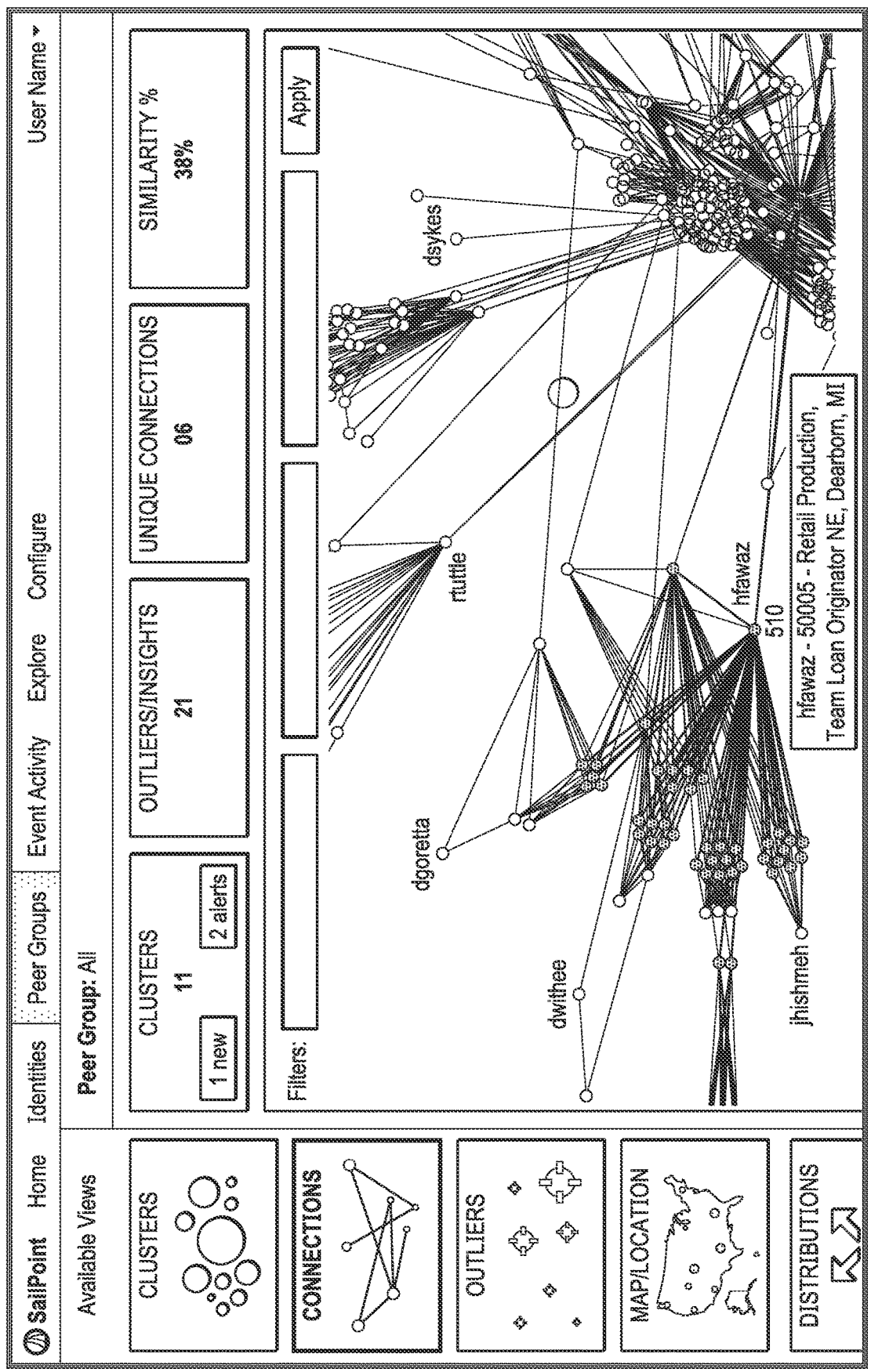

FIG. 5 depicts an embodiment of interface that may be utilized by an identity management system to visually present data regarding the peer groups determined for identities within an enterprise. Here, the interface may present a visual representation of the identity graph as discussed above where each identity node is represented by a circle and each edge is represented by a line joining the nodes, where the closer the nodes the higher the similarity value between the nodes. The interface may also present information regarding the number of peer groups (clusters) determined for the identity graph being presented (in this example 11).

The interface, or a portion thereof, may allow the user to navigate around the identity graph and "drill down" to obtain information on a represented node or entitlement. In the depicted example, the user has hovered above a node 510 of the identity graph and information about that identity is presented through the interface to the user. By looking at such an identity graph a user may be able to discern, for example, which identities which may be "highly contagious" or represent other identity management risks or compliance issues. An identity may be "highly contagious" or otherwise represent an identity governance risk, for example, if that identity may have a number or type of entitlement such that if those identities are replicated without identity governance oversight (e.g., assigned to other users) it may cause identity governance issues such as unintended entitlement bloom.

Figure 6:
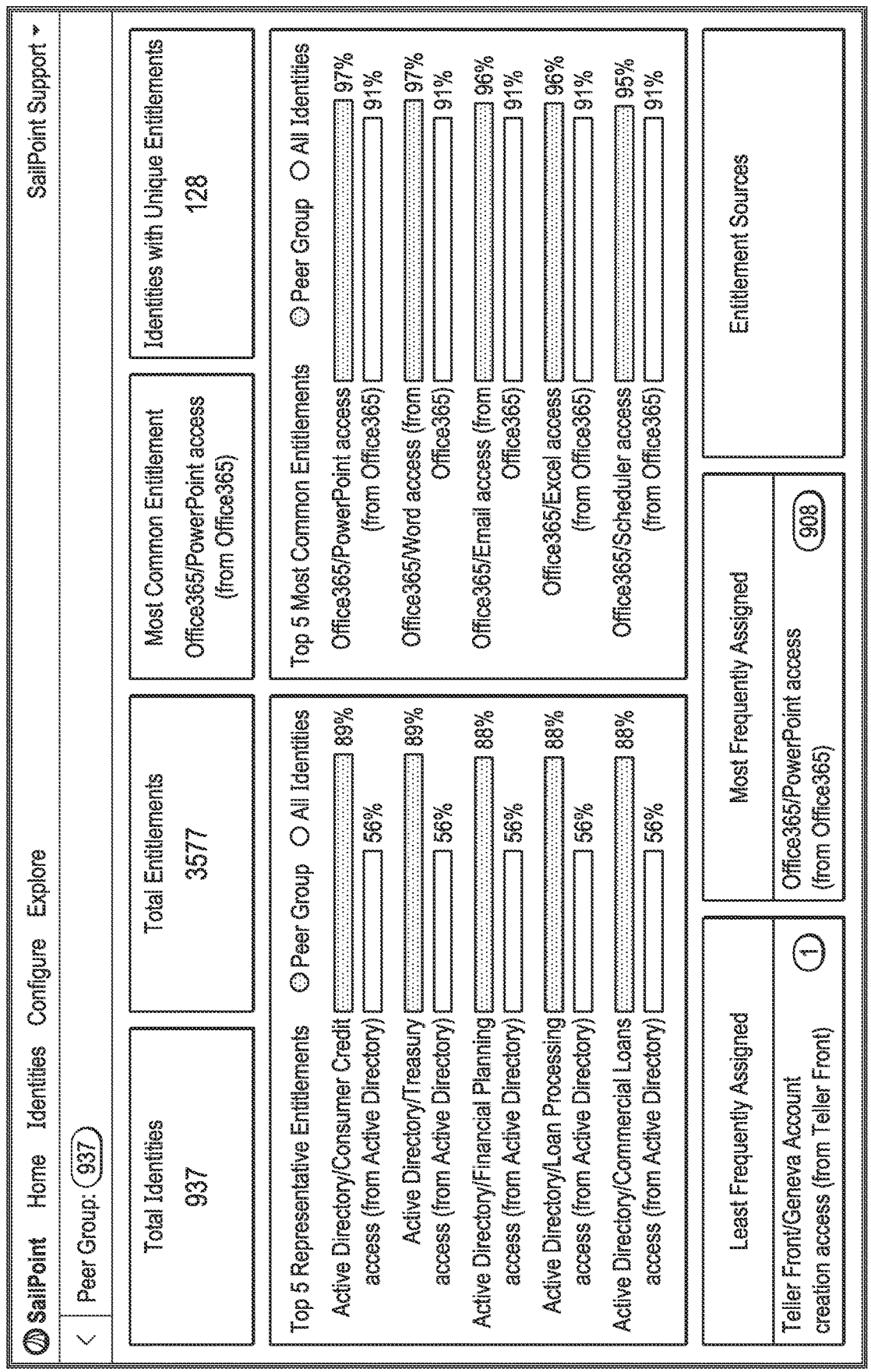

FIG. 6 depicts an embodiment of another interface that may be utilized by an identity management system to visually present data regarding the peer groups determined for identities within an enterprise. In this example, the interface can present data regarding a particular peer group determined for an identity graph, showing, for example, the number of identities within that peer group, what the entitlements are within that peer group, what identities share those entitlements, or why those identities have been grouped together. The interface may also present a wide variety of other data regarding that peer group or identities or entitlements within that (or other) peer groups, including for example, how that peer group, identities within that peer group or other entitlements relate to each other or other determined peer groups, identities or entitlements of the enterprise. Thus, a user viewing such an interface may be able to ascertain reasons why the identities have been grouped and explore for outliers and see entitlements that these identities have in common with each other, as well as how different they are from the rest of the identities and entitlements of an enterprise. Moreover, the user may also "drill down" for more details to discover which identities included and the entitlements assigned.

Figure 7:
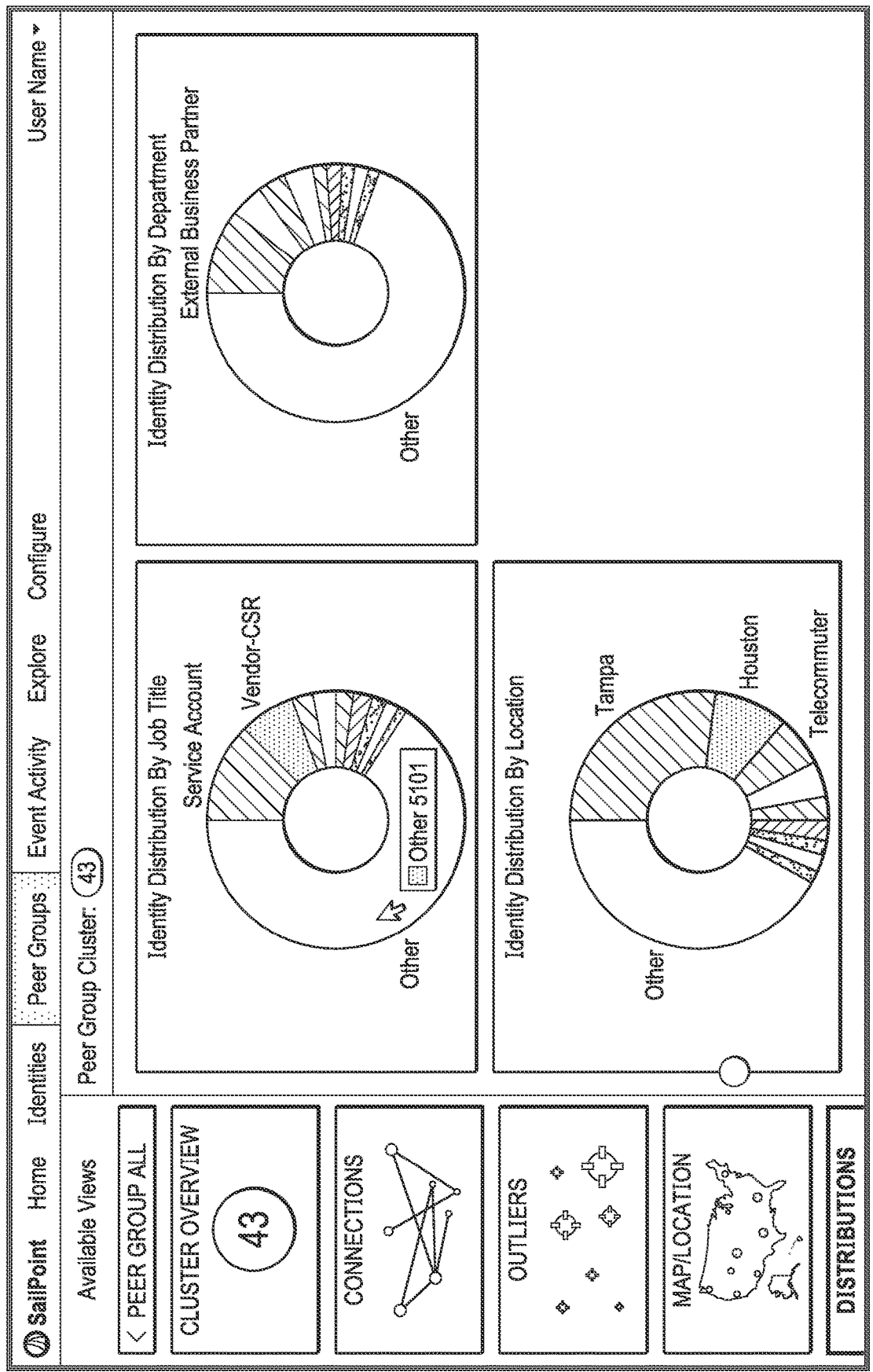

FIG. 7 depicts an embodiment of still another interface that may be utilized by an identity management system to visually present data regarding the peer groups determined for identities within an enterprise. In this example, the interface can present data regarding a particular peer group (e.g., peer group 43) determined for an identity graph, showing, for example, distributions of identities within the peer group, such as the identities of the peer group's correlation with departments, location or job title. Consequently, a network graph representation of the identity-to-identity entitlement-based similarity can serve as a vehicle for outlier detection and risk assessment.

Risk in such an identity management context may include things such as policy violations, rampant and uncontrolled approval of access, the inflation or dispersal of entitlements, poor management of restricted access, overly dominant or generic roles or other types of risk. As can be seen then, embodiments using identity graphs as discussed, may be especially useful in assessing risk and in compliance with security policies or the like. The graph based identity management systems as disclosed herein, allows improved graph-based approaches to detection of risks, including risks associated with identities of an enterprise. By representing the identities' equivalence (or similarity) structure as modeled by an identity graph, embodiments of an identity management system may capitalize on the identity graph's reflection of the relevant homophilic aspects of access entitlements. As a result, the graph clustering as discussed may produce peer groups of strongly similar identities, which facilitates the detection of 'abnormal' identities as outliers. Abnormalities in a peer group are typically viewed as indicators for risk as they are most likely the result of lapses in the entitlement assignment process or certification campaigns.

To illustrate more specifically, identifying risk items may be one of the first step towards developing effective risk management procedures to deal with vulnerabilities as soon as they arise. Defining, identifying, and assessing risk is, however, a highly non-trivial task. This is due to risk not being well-defined across different industries or even departments within a particular industry or enterprise. Moreover, assessing and quantifying risk may require considerable domain-specific and nuanced expertise, which makes it an extremely challenging task for current methods to approximate.

Consider the case of Jane D., a senior analyst at Acme Corp for 10 or more years. During this time, Jane has collaborated with countless teams on joint projects. Throughout the years, she had accumulated hundreds of access entitlements. As a result, her entitlement peers are VP-level executives. This may present a risk to Acme Corp. The issue here is that Jane, albeit perhaps a highly active & effective employee, does not receive any of the security training or oversight that a VP-level individual typically goes through. Moreover, if any of Jane's accounts are compromised, the damage might be hard to contain. This situation is an example of an access 'anomaly'. Identifying all these anomalies and recommending a proper action, e.g., triggering special certification event, revoking unutilized access, role assessment, etc. will improve security by mitigating the risks from these anomalous identities.

The graph based identity management systems as disclosed herein allows improved graph-based approach to detection of risks, including risks associated with identities, entitlements, roles, or other artifacts, of an enterprise. This is at least because identity governance is predicated on the principle that strongly similar identities should be awarded similar access. In other words a person's access profile should not be too much different from their peers. Consequently, identities whose access patterns are dramatically and unjustifiably different from their peers may be considered or identified as a source of risk.

Moreover, a peer group (of identities, entitlements, or roles) is a social structure. Therefore, graph representations of identities, entitlements or other identity management artifacts with a proper choice of similarity measure, creates a faithful and tangible model of the similarity structure of those artifacts with respect to an enterprise. Thus, an identity graph (e.g., when pruned to a high degree of similarity) may approximate the hierarchical structure of an organization, and robust, efficient graph clustering algorithms yield peer groups within the graph of high quality. Graphs also lend themselves to visual presentations that allows communication of deeper, identity-level insights and deliver them directly to the user via an intuitive interface. Additionally, several graph analytics tools can be utilized to detect outlier entities (identities, entitlements, or roles) and can be implemented as queries directly on a graph database, expediting & simplifying (by unifying) a production implementation and improving scalability of those implementations.

To that end, among others, attention is now directed to the embodiments artificial intelligence based identity governance systems including such outlier detection for risk management. Embodiments may perform outlier detection based on an identity management data, including one or more property graphs or peer groups determined from that property graph to determine identity management artifacts with 'abnormal' patterns when compared to other related identity management artifacts (e.g., identities, entitlements or roles associated with a similar department, physical location, peer group, etc.). At least two possible modes of analysis may be used by an identity management system in performing outlier detection to identify access risk through the identification of anomalies using the identity graph or multiple versions thereof.

The first type of identification of anomalies may take place with respect to a particular snapshot of identity management data, or a single identity graph from a particular snapshot. This is referred to as identification of a static anomaly or a static analysis. However, the identity graph (or different versions thereof) as maintained by an identity management system can be thought of as a dynamically evolving structure reflecting the evolving nature of the identity management artifacts being modeled within an enterprise. More generally, the identity attribute and entitlement data get harvested, updated and stored regularly as time-stamped snapshots as discussed above. This may trigger an update process for the identity graph. Consequently, a second type of identification of access risk manifests as a result of the dynamic changes occurring due to the dynamic evolving nature of the identity graph (e.g., and identity management data, including event data). This type of analysis may be referred to as dynamic analysis.

Accordingly, while embodiments of an identity management system may employ static risk assessment, embodiments of an identity management system may also employ dynamic risk assessment in certain embodiments for outlier detection to detect risk based on an identity graph and data reflecting usage of entitlements over time, or from two or more graphs generated by the identity management systems from data reflecting two or more different points in time. In such dynamic risk assessment, identities with 'abnormal' dynamic patterns (e.g., usage patterns, varied attributes or entitlements) may be identified using the two or more graphs or identity management data related to events in association with those identity graphs.

Figure 8:
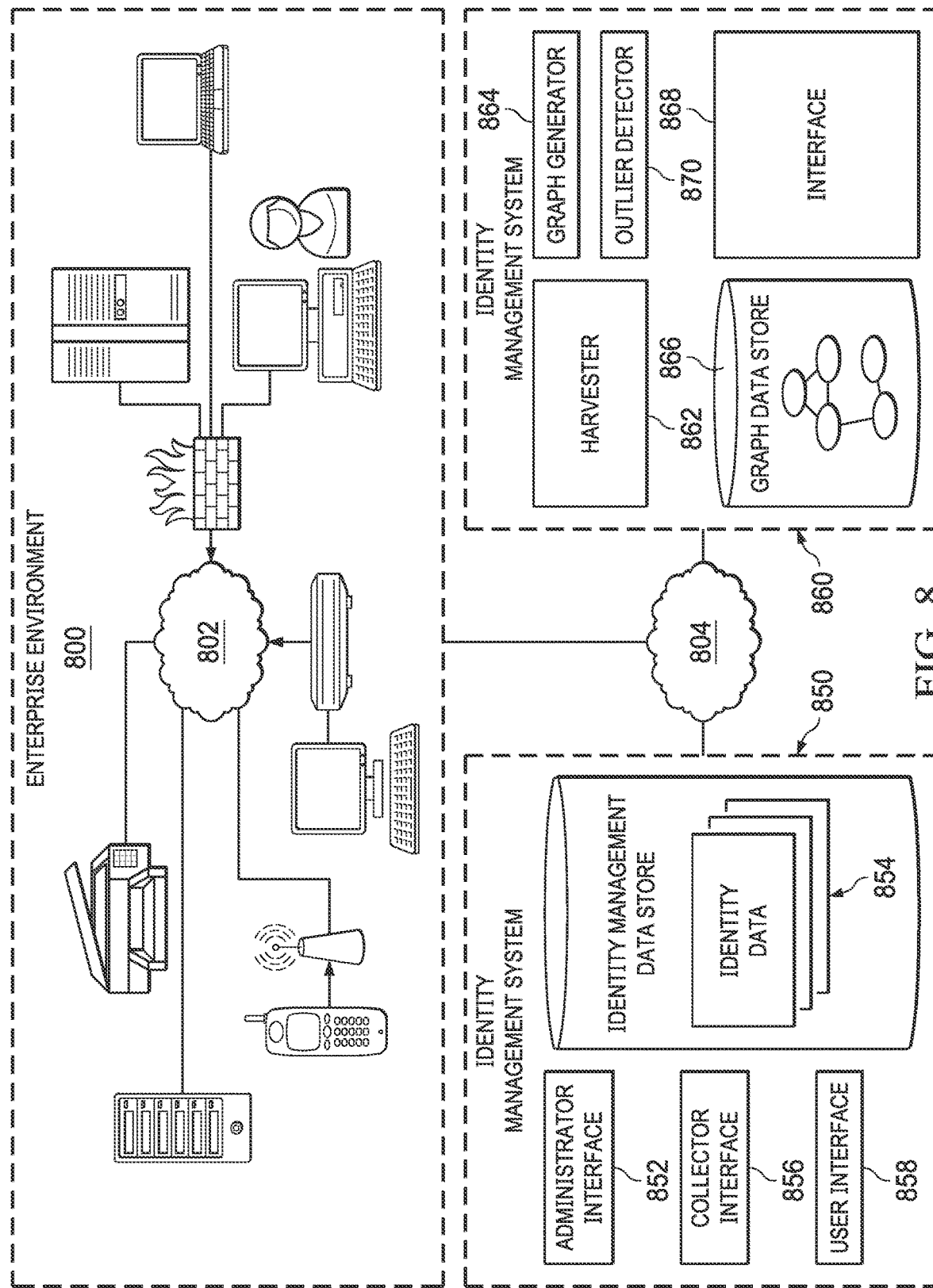
FIG. 8 is a block diagram of a distributed networked computer environment including one embodiment of an identity management system.

Referring to FIG. 8, a distributed networked computer environment including an identity management system with one embodiment of outlier detector is depicted. As discussed above, the networked computer environment may include an enterprise computing environment 800 including a number of computing devices or applications that may be coupled over a computer network 802 or combination of computer networks. Enterprise environment 800 may thus include a number of resources, various resource groups and users associated with an enterprise. Users may have various roles, job functions, responsibilities, etc. to perform within various processes or tasks associated with enterprise environment 800.

Users may access resources of the enterprise environment 800 to perform functions associated with their jobs, obtain information about enterprise 800 and its products, services, and resources, enter or manipulate information regarding the same, monitor activity in enterprise 800, order supplies and services for enterprise 800, manage inventory, generate financial analyses and reports, or generally to perform any task, activity or process related to the enterprise 800. Thus, to accomplish their responsibilities, users may have entitlements to access resources of the enterprise environment 800. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 800 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; or for other reasons. Access risks can also arise from roles in enterprise environment 800 which may shift, change, evolve, etc. leaving entitlements non optimally distributed among various users.

To assist in managing the entitlements assigned to various users and more generally in managing and assessing access risks in enterprise environment 800, an identity management system 850 may be employed. Such an identity management system 850 may allow an administrative or other type of user to define one or more identities, entitlements, roles, etc. and associate these identities with entitlements or roles or perform other identity governance tasks using, for example, an administrator interface 852. Examples of such identity management systems are Sailpoint's IdentityIQ and IdentityNow products. Note here, that while the identity management system 850 has been depicted in the diagram as separate and distinct from the enterprise environment 800 and coupled to enterprise environment 800 over a computer network 804 (which may the same as, or different than, network 802), it will be realized that such an identity management system 850 may be deployed as part of the enterprise environment 800, remotely from the enterprise environment, as a cloud based application or set of services, or in another configuration.

The identity management system 850 may thus store identity management data 854. The identity management data 854 stored may include a set of entries, each entry corresponding to and including an identity management artifact (e.g., alphanumerical identifiers for identities, entitlements, roles, etc.) as defined and managed by the identity management system, a list or vector of entitlements, roles, etc. (e.g., alphanumeric identifiers for entitlements or roles) assigned to that identity by the identity management system, and a time stamp at which the identity management data was collected from the identity management system.

Other data could also be associated with each identity or identity management artifact including data that may be provided from other systems (e.g., including identity management system 860) such as a title, location or department or usage data associated with the identity or other identity management artifacts. Other types of data may include, for example, data determined when analyzing the identity management artifacts or when generating a graph representing such identity management artifacts. This type of data may include, for example, data representing a similarity between identity management artifacts such as similarities determined between identities, entitlements or roles. This data may be determined at a particular interval, or during generation of a graph (as detailed above) and may be stored, for example, as a matrix of similarities determined between each identity, entitlement or role.

Accordingly, the collectors 856 of the identity management system 850 may obtain or collect event data from various systems within the enterprise environment 800 and process the event data to associate the event data with the identities defined in the identity management data 854 to evaluate or analyze these events or other data in an identity management context. Data obtained by harvester 862 may include usage or other event data obtained from systems within the enterprise environment. The usage or user activity data may include data obtained or reported from a third party source or application. Such usage data may include login data for accounts and the usage of various entitlements associated with those accounts. Splunk is one such example of an application from which such usage data may be obtained.

As part of a robust identity management system, it is desirable to analyze the identity management data 854 associated with an enterprise 800. An identity management system 860 may include a harvester 862 and a graph generator 864. The harvester 862 may obtain identity management data 854 from one or more identity management systems 850 associated with enterprise 800. Graph generator 864 may generate one or more property graphs including, for example, one or more identity graphs (e.g., including peer grouped identities), one or more entitlement graphs (e.g., including peer grouped entitlements) or role graphs (e.g., including peer grouped roles) from the obtained identity management data 854 and store the property graph in graph data store 866. These graphs may be stored or versioned such that one or more previously generated graphs may be stored in graph data store 866 or can be generated from a graph currently stored in graph data store 866. An interface 868 of the identity management system 860 may use an identity graph in the graph data store 866 or associated peer groups to present one or more interfaces which may be used for risk assessment, as has been discussed.

Additionally, a user may interact with the identity management system 850 through a user interface 858 to access or manipulate data on identities, entitlements, events or generally perform identity management with respect to enterprise environment 800. Including viewing of representations of the graph stored in the graph data store 866 or requesting and viewing analysis of such graphs.

As discussed previously, it is desired in identity governance solutions to provide high quality risk assessment. Accordingly, embodiments of an identity management system 860 may capitalize on the data obtained about identity management artifacts or the graph determined and stored in graph data store 866 (e.g., and associated peer groups of such graphs) to facilitate the detection of 'abnormal' identities or other artifacts as outliers.

In particular, outlier detector 870 may serve to analyze identity management data 854 or a graph or graphs stored in the graph data store 866 along with peer groups of the nodes of that graph (e.g., peer groups of identities, entitlements or roles) to determine various types of outliers or other anomalies within identity management data obtained or created by the identity management systems 850, 860. Such analysis may include analysis of the identity management data 854 using techniques such as spectral clustering or matrix factorization or may include the use of graph based algorithms or analysis of the property graph stored in the graph data store 866 such that these anomalies and associated representations of the graph (or data thereof) and associated identity management artifacts may be presented through the user interface 868 of the identity management system 860 as "high risk" (or some other indicator) to allow a user to proactively discover and prioritize vulnerabilities of access management systems.

The high risk outlier may include for example identity outliers, entitlement outliers or role outliers. Identity outlier may include identities with extremely low similarity with other identities, identities with no or few roles, identities with an extremely high or low number of entitlements, or identities associated with a structural anomaly within a property graph. Entitlement outliers may be those with extremely low similarity to other entitlements or those that are not associated with a role (or few roles) or are frequently assigned or approved but are not heavily utilized. Role outliers may include roles that are strongly similar to other roles, are highly fragmented or nested or are highly generic. Other types of outliers may also be realized and determined by embodiments as disclosed herein.

At the same time, it may enable decision support for the users with respect to proper actions to take with respect to such identified high risk identity management artifacts, including the use of autonomous, intelligent decision-support agents to provide advice or recommendations on proper actions. For example, for identities with extremely low similarity with other identities, a recommendation for certification or role mining may be provided. A recommendation for identities associated with a structural anomaly within a property graph may be to label or track that identity. Entitlement outliers may be recommended for certification or deprecation or, in the case of out of role entitlement may be recommended for assignment to a closest role. In the case of role outliers, it may be recommended to consolidate roles that are too similar to other roles, to validate highly fragmented roles, or to perform role mining if generic or dominant roles are discovered. Other recommendations may also be realized and utilized by embodiments as disclosed herein.

Such outliers and associated recommendations may, for example, be presented as part of a recommendation for decision support as described in U.S. patent application Ser. No. 16/286,289, entitled "A System and Method for Intelligent Agents for Decision Support in Network Identity Graph Based Identity Management Artificial Intelligence Systems" filed on Feb. 26, 2019 or as part of other interfaces such as those described in U.S. patent application Ser. No. 16/288,850, entitled "System and Method for Role Mining In Identity Management Artificial Intelligence Systems Using Cluster Based Analysis of Network Identity Graphs" filed on Feb. 28, 2019, both of which are incorporated herein by reference in their entirety for all purposes.

As discussed above, generally, identity attribute and entitlement data, along with other identity management data, gets harvested, updated and stored regularly as time-stamped snapshots as discussed above. This may trigger an update process for the property graph stored in graph data store 866. The property graph (or different versions thereof) as maintained by an identity management system 860 can thus be thought of as a dynamically evolving structure. Consequently, at least two possible modes of analysis may be used by outlier detector 870 to identify outliers that may present access risk through the identification of anomalies using the property graph, or multiple versions thereof. The first type of identification of anomalies may take place within a particular snapshot or a single property graph from a particular snapshot. This is referred to as identification of a static anomaly or a static analysis. A second type of identification of access risk manifests as a result of the dynamic changes occurring due to the dynamic evolving nature of the identity management data and associated property graph (e.g., and identity management data, including event data). This type of analysis may be referred to as dynamic analysis.

Turning first to static analysis of identity management data in an identity management system; in general, and as pointed out previously, the use of property graphs by embodiments by outlier detector 870 may allow the identification of noise or other patterns in peer groups. Such an ability may thus enable the identification of abnormal identities as they are represented by graph nodes with an abnormal configuration. In one embodiment, therefore outlier detector 870 may employ static risk assessment using a property graph stored in graph data store 866. In such static risk assessment, outlier detector 870 may utilize a property graph, or peer groups determined from that property graph, to determine the identities (or other artifacts) with the most 'abnormal' entitlement patterns when compared to other related identities (e.g., identities in a similar department, physical location, peer group, etc.). The ability to perform such static assessment may be facilitated by the storage of the property graph in a graph data store 866 that utilizes Neo4J or another graph database that may be utilized as graph data store 866, as such data stores may be queried more easily and accomplished more quickly and with less overhead. The criteria used to determine whether an identity or other artifact is abnormal may be a wide variety of criteria in different embodiments, including, for example, degree of connectivity or in-betweenness of a node in the graph representing that identity, or other criteria.

Figure 9A:
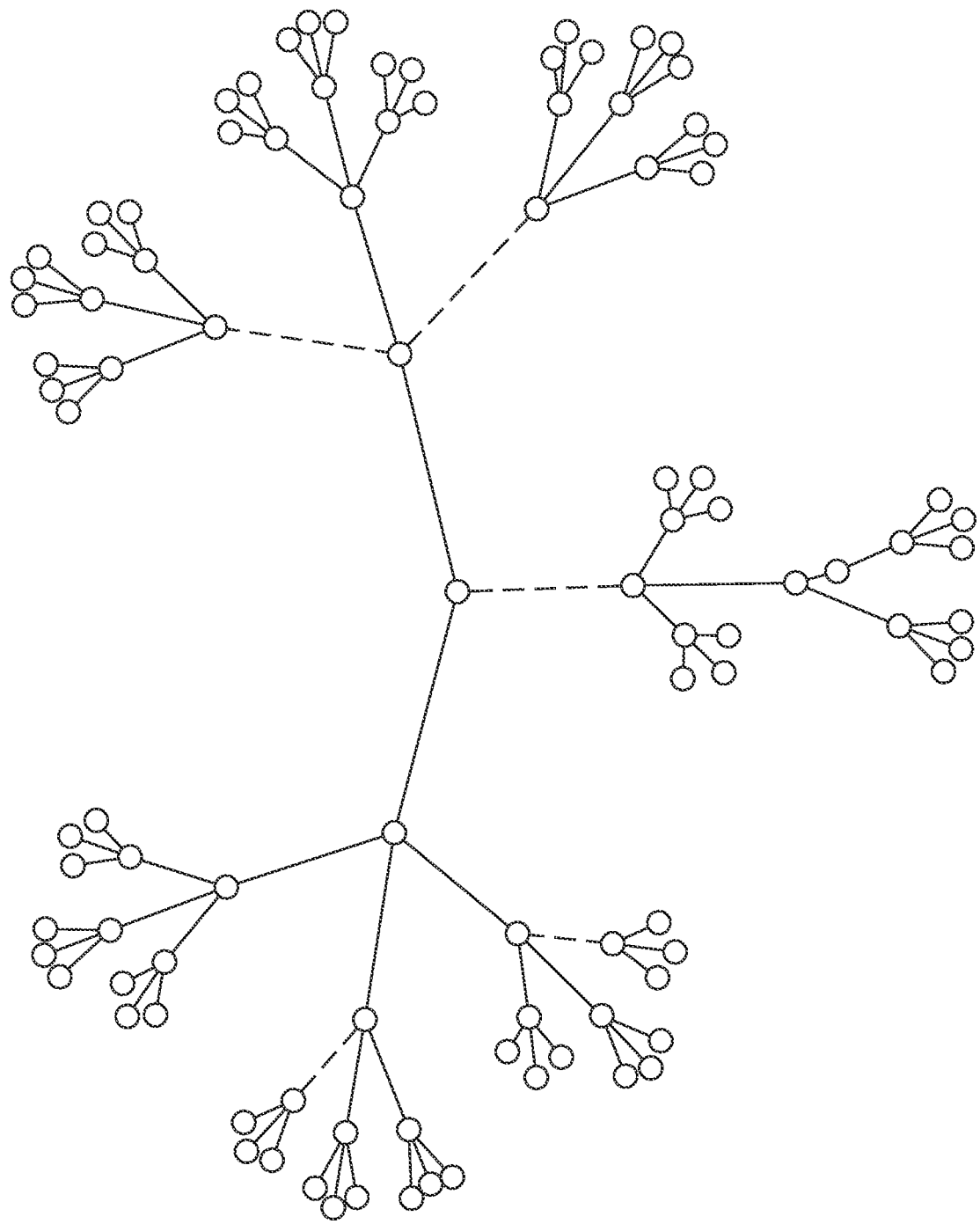
FIGS. 9A, 9B, 9C, and 9D depict example visual representations of graphs.
Figure 9B:
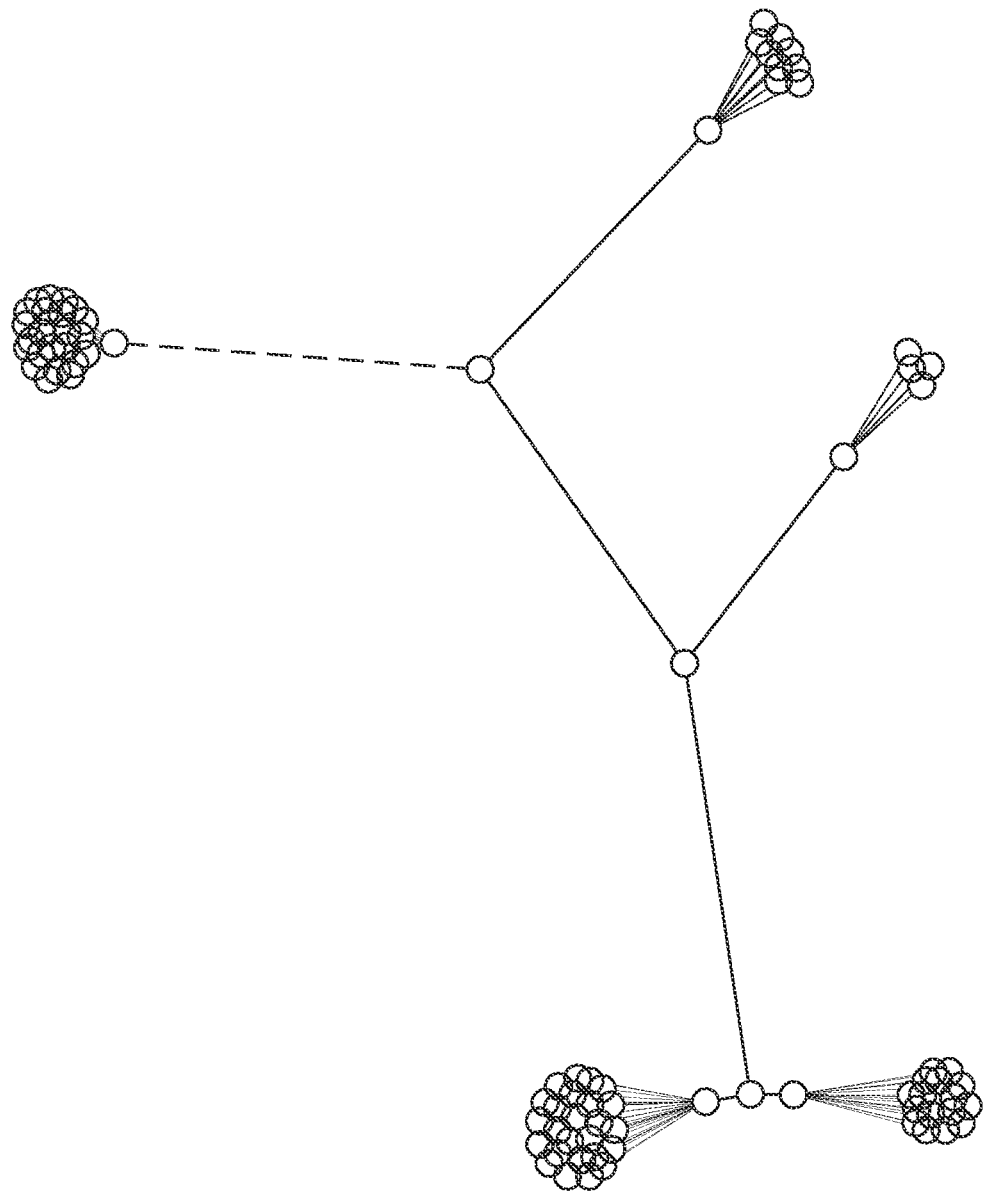

Turning first to static analysis of identity management data by outlier detector 870; in general, and as pointed out previously, the use of identity graphs by embodiments of identity management system 860 may allow the identification of noise or other patterns in peer groups. Such an ability may thus enable the identification of abnormal identities as they are represented by graph nodes with an abnormal configuration. Looking briefly at FIGS. 9A, 9B, 9C and 9D example representations of peer groupings within identity graphs are depicted. FIGS. 9A and 9B depict examples of normal peer groupings, while FIGS. 9C and 9D depict examples of abnormalities in peer grouping.

Figure 9D:
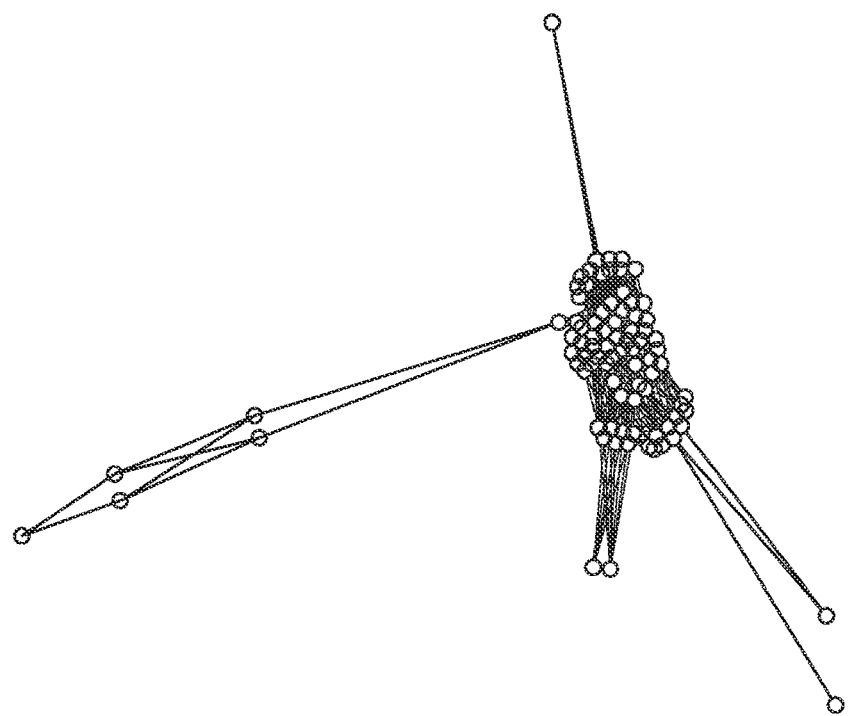
Figure 9C:
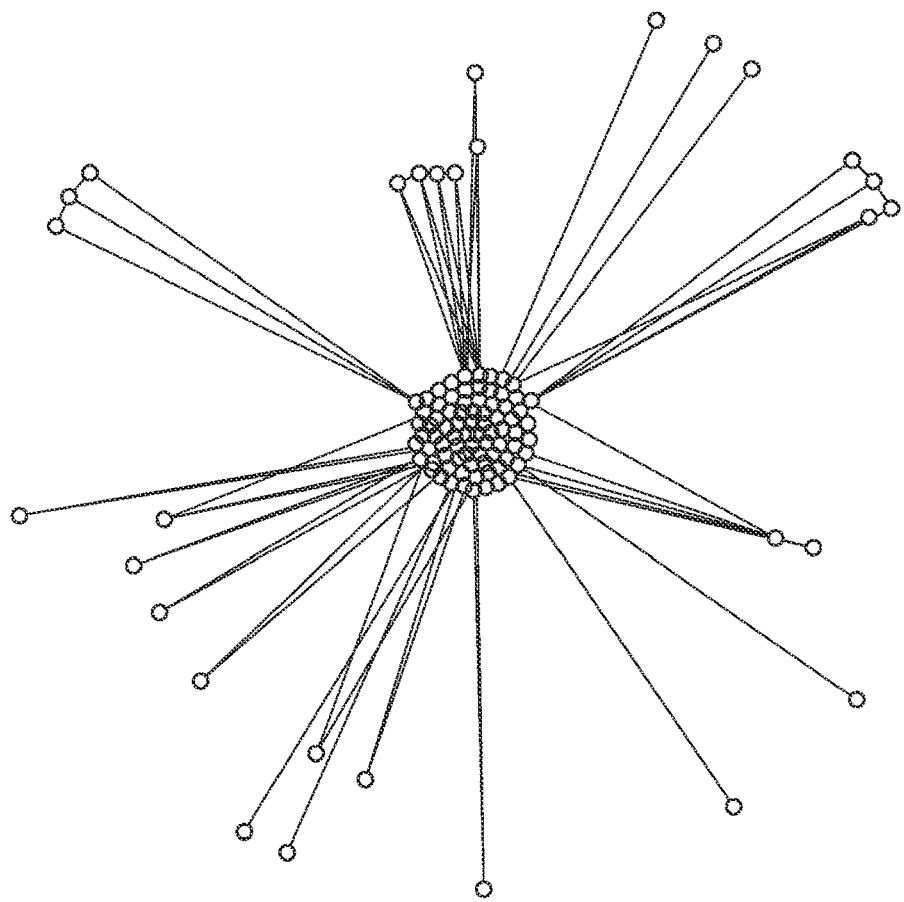

As can be seen from FIGS. 9C and 9D the identities represented by several peripheral nodes are not as strongly connected to the rest of the nodes within the peer group. Overall, it can be anticipated that an optimized peer group, for the purposes of access entitlement, should be relatively homogeneous and coherent in terms of its graph topology or structure, as can be seen by contrasting these examples with the examples of FIGS. 9A and 9B.

Accordingly, embodiments of identity management systems 860 may query a property graph to identify the certain types of nodes of the property graph (e.g., representing particular identity management artifacts) such that associated access risk may be presented to a user of the identity management system through an interface. One type of node that may be determined by outlier detector 870 may be what is referred to as extreme identity. This may be an identity with an extremely high (e.g., over or equal to some upper entitlement threshold) or an extremely low (e.g., below or equal to some lower entitlement threshold) number of entitlements. To determine such identity nodes, the outlier detector 870 may perform a query on the identity nodes of the graph of the graph data store base on an upper entitlement threshold or lower entitlement threshold. Outlier detector 870 may also access the identity graph to implement an outlier detection such as Tukey's criterion, to identify identities of the identity graph with unusually high (or low) number of entitlements in a peer group. It may also be realized that in certain embodiments such a determination may be made utilizing identity management data 854 that is not represented in a graph structure or other identity management data, as long as such identity management data includes an association between such identities and entitlements.

Another example of static risk assessment that may be performed by outlier detector 870 is to determine identities or other artifacts (e.g., entitlements or roles) which are represented by isolated nodes in the property graph (which may be referred to as 'singletons'). This isolation may indicate that all their connections' strength falls below the pruning threshold (e.g., used when the property graph is created by graph generator 864) or are otherwise weak and, in turn, that (in the case of identities) their entitlements or entitlement patterns are rare or unique. In other words, somewhat opposite to the cluttering approach used in generating a graph, a singleton identity may have a low similarity to other identities either globally across the property graph or within a subset of identity nodes, such as identities within a department or location, identities with a particular title, etc. These identities may pose a higher risk from identity governance perspective and should be reported to a user through the interface 868 of the identity management system 860 for proper action (e.g., a targeted certification campaign). In a similar manner, using the entitlement graph, outlier detector 870 may determine a singleton entitlement. These singleton entitlements may be entitlements of the property graph that are weakly, or not at all, concurrently assigned with other entitlements as part of a role or a common access pattern.

Thus, to determine a singleton identity (or entitlement the similarity (e.g., a Jaccard similarity or the like) between each of the artifacts of interest (e.g., identity, entitlement or role) and every other type of the same type of artifact (e.g., identity or entitlement) may be determined. This may, for example, be determined when constructing a property graph (e.g., before pruning the graph) and stored as part of identity management data 854, or may be determined based on identity management data to, for example in the case of identities, create a matrix with a row for each identity and a column for each identity such that value for a particular entry in the matrix the values are the computed similarity between the identities of the corresponding row and column. Such a similarity may be computed at a particular time interval such as nightly or weekly and used to determine such singleton artifacts separately from the generation of a graph (and even in the absence of such a property graph), or in conjunction with, the generation of a graph for those identity management artifacts. Thus, to determine a singleton artifact, a set (e.g., one, all, a number with the lowest similarity, etc.) of artifacts (e.g., identity or entitlement) whose similarity to all others of the same type of artifact falls below a certain singleton threshold (which may be different for different types of artifacts or artifacts with different criteria such a location, title, department, etc.) may be identified as a singleton.

FIG. 10 displays data associated with a peer grouped identity graph represented on each row. Specifically, table of FIG. 10 shows the break-down of the singleton identities with the weakest similarity connections for an example enterprise. The top most row of the table show a group of singleton identities with temporary service accounts (e.g., "Service Account", typically granted for temporary root access to Unix & Linux systems) which are still active and should be identified as singletons or outliers by an identity management system. The second row shows a group of singleton identities that are external contractors and that should be identified as singletons or outliers by an identity management system. Such external contractors may be singleton identities as a result, for example, of lack of role structure or assignment for individual contractors.

Another type of outlier that can be determined by the outlier detector 870 is what is referred to as an out-of-role outliers. For example, out-of-role outliers sometime arise as part of the singleton outlier population. An out-of-role identity may be, for example, an identified identity that lacks a specific role assigned to it, or has a highly fragmented role assignment. An out-of-role entitlement may be an identified entitlement in the graph that is not part of any role. While not every access entitlement may be part of a role, (e.g., representing generic entitlements such as email, messaging, etc.), the out-of-role entitlements may be non-generic entitlements that are not part of any role in certain cases.

Embodiments of identity management systems may also query a property graph to identify identities with outlier entitlement patterns: these are the identities with uncommon or rare entitlement patterns relative to their 'peers' (e.g., within their peer groups, departments, pre-defined identity groups with same roles, titles, or the like). Identities with fragmented entitlement patterns may be those identities within a certain peer group, that have relatively weaker similarities due to their (e.g., unique or rare) entitlement combinations. In some cases that could be as a result of, for example, a fragmentation of entitlement patterns (e.g., possessing entitlements that are not part of common roles within the peer group).

Figure 11:
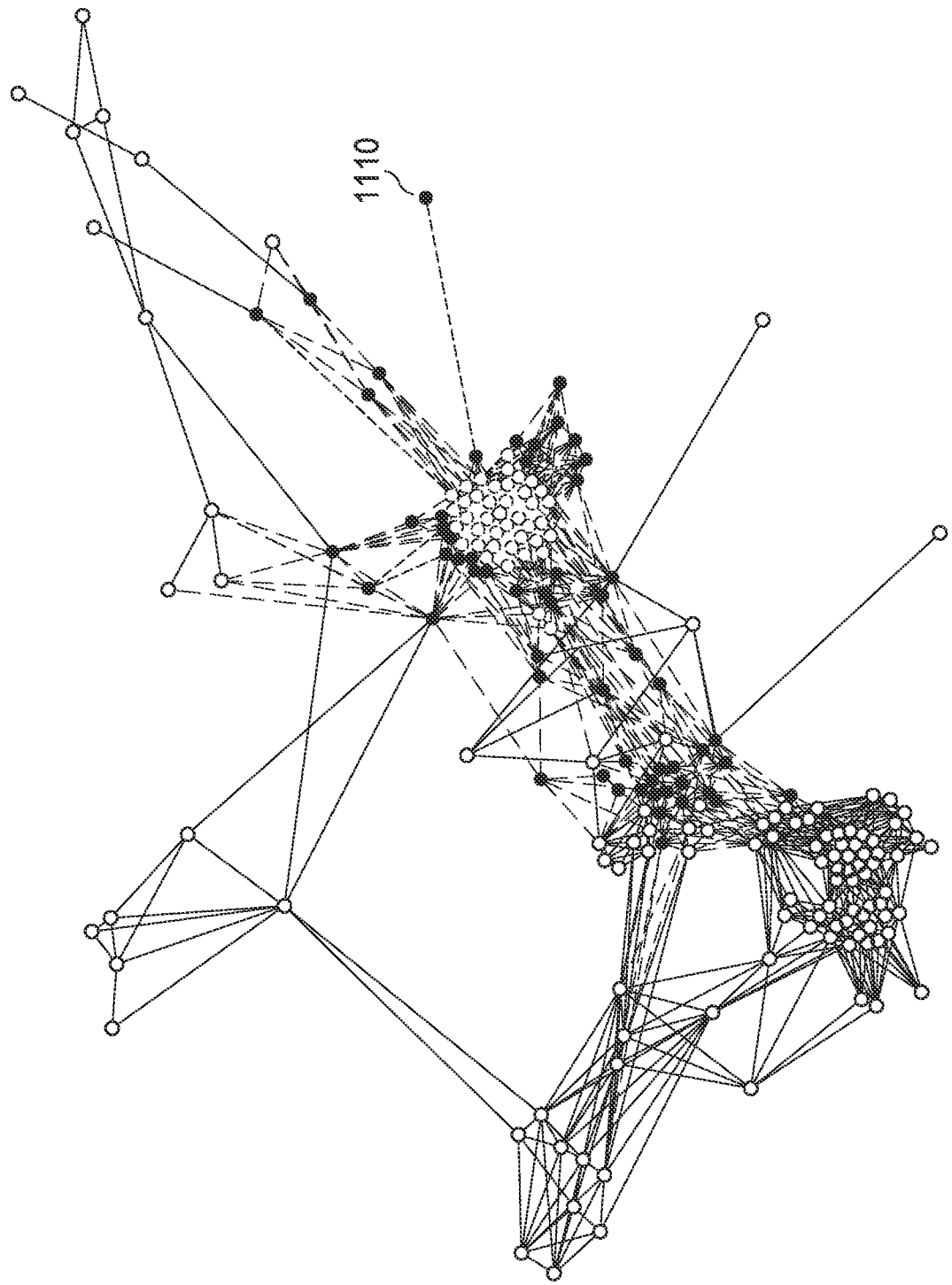
FIGS. 11-15 depicts example visual representations of a graph.
Figure 12:
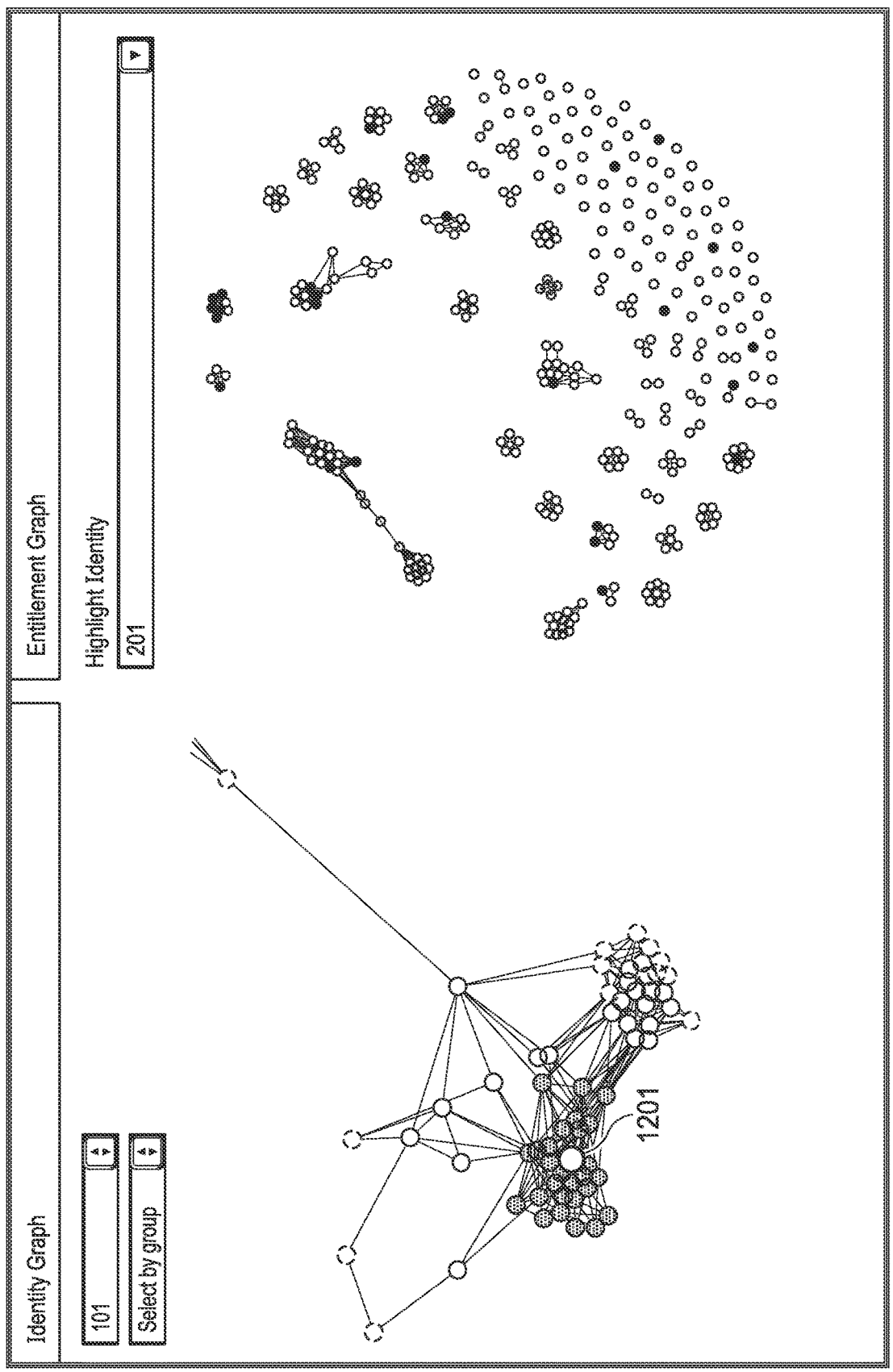

For example, FIG. 11 depicts an identity node 1110 with an outlier entitlement pattern, while FIG. 12 shows identity 1201 on the left side contrasted with that identity's (identity 1201) entitlement combination on the right side of the figure. Clustered entitlements on the right side of the figure correspond to typical roles within this particular peer group. Identities such as one like identity 1201 show highly fragmented entitlement patterns. Fragmented entitlements for an identity of a peer group could be an indicator for atypical access entitlements. Such identities may therefor pose risk as the source of discrepancy between these entitlement patterns could be due to deprecated, unauthorized, recently uncertified, or missing entitlements. Recommending a proper action (e.g., re-certifying entitlements or recommending to add missing entitlements) may cause the outlier identity to be assimilated in the clique, and thus, minimize the number of uncommon entitlement patterns, and as a result, minimize and mitigate risk to the enterprise.

Within a given peer group of the identity graph, a clique represents a group of identities with strongly similar entitlement combinations. Therefore, cliques (as well as pseudo-cliques—dense communities with almost as many edges as a clique) may represent or include the most prevalent entitlement patterns within a peer group. A 'stray' identity that is closely connected to a clique or a pseudo-clique but is not part of it indicates that the identity's entitlement pattern is slightly different from the prevalent pattern within the clique and can be identified as an identity with an outlier entitlement pattern.

Thus, to find a set of entitlements for a peer group, an identity management system can find one or more cliques within a peer group determined for the identities of the identity graph. These cliques may be determined, for example, using the igraph function in the R library of Python. For each clique then, an entitlement pattern may be determined. This entitlement pattern may be, for example, a set of entitlements common to the clique or which are shared by a large number of identities of the clique. The entitlements of identity nodes meeting a certain criteria (e.g., below a threshold for connectivity or the like) may then be compared with the entitlement pattern determined for the clique to determine a similarity between the entitlements of that identity node and the entitlement pattern of the clique. If the similarity of entitlements is below a threshold this identity node may be identified by the identity management system as an identity with an outlier entitlement pattern.

Figure 13:
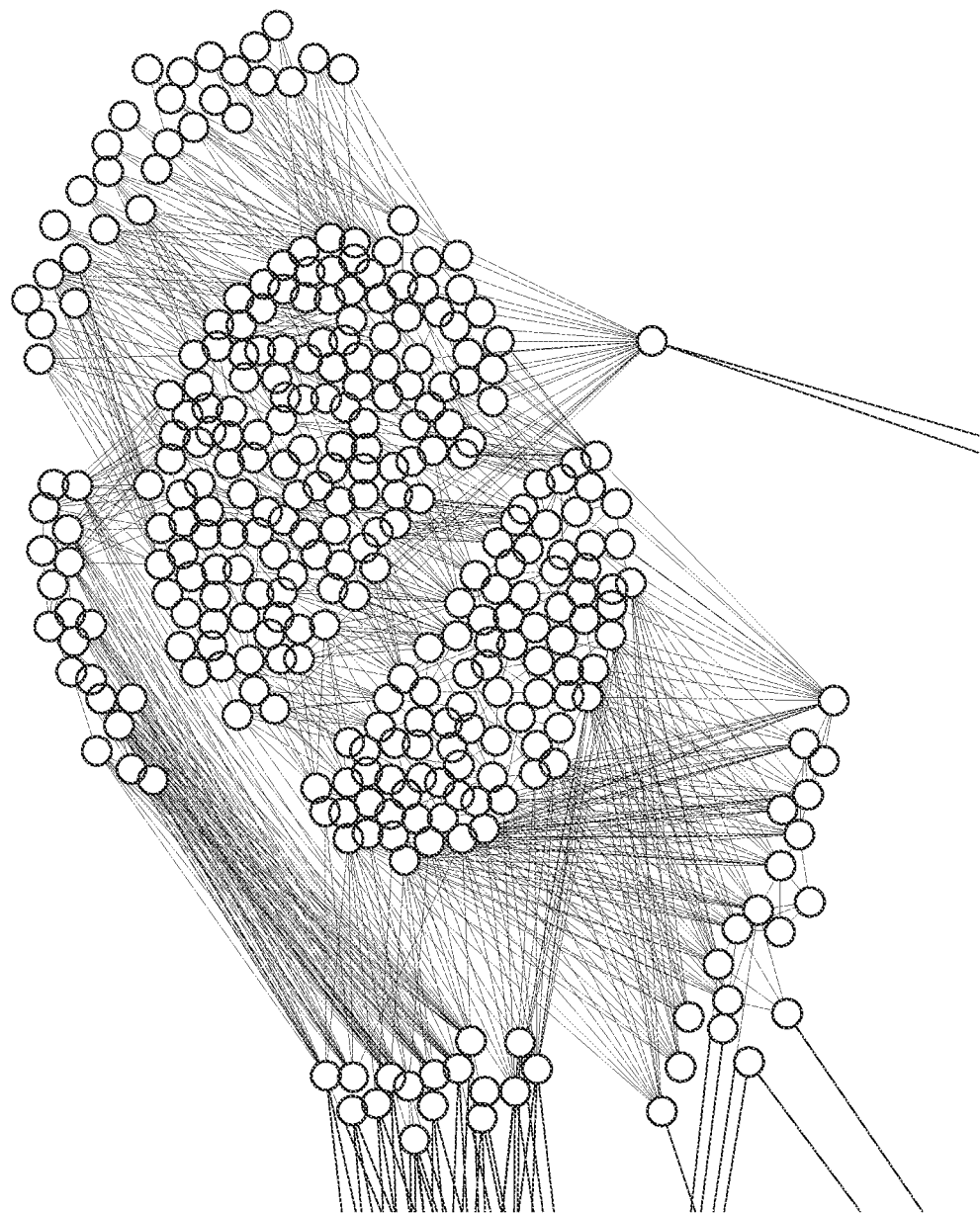
Figure 14:
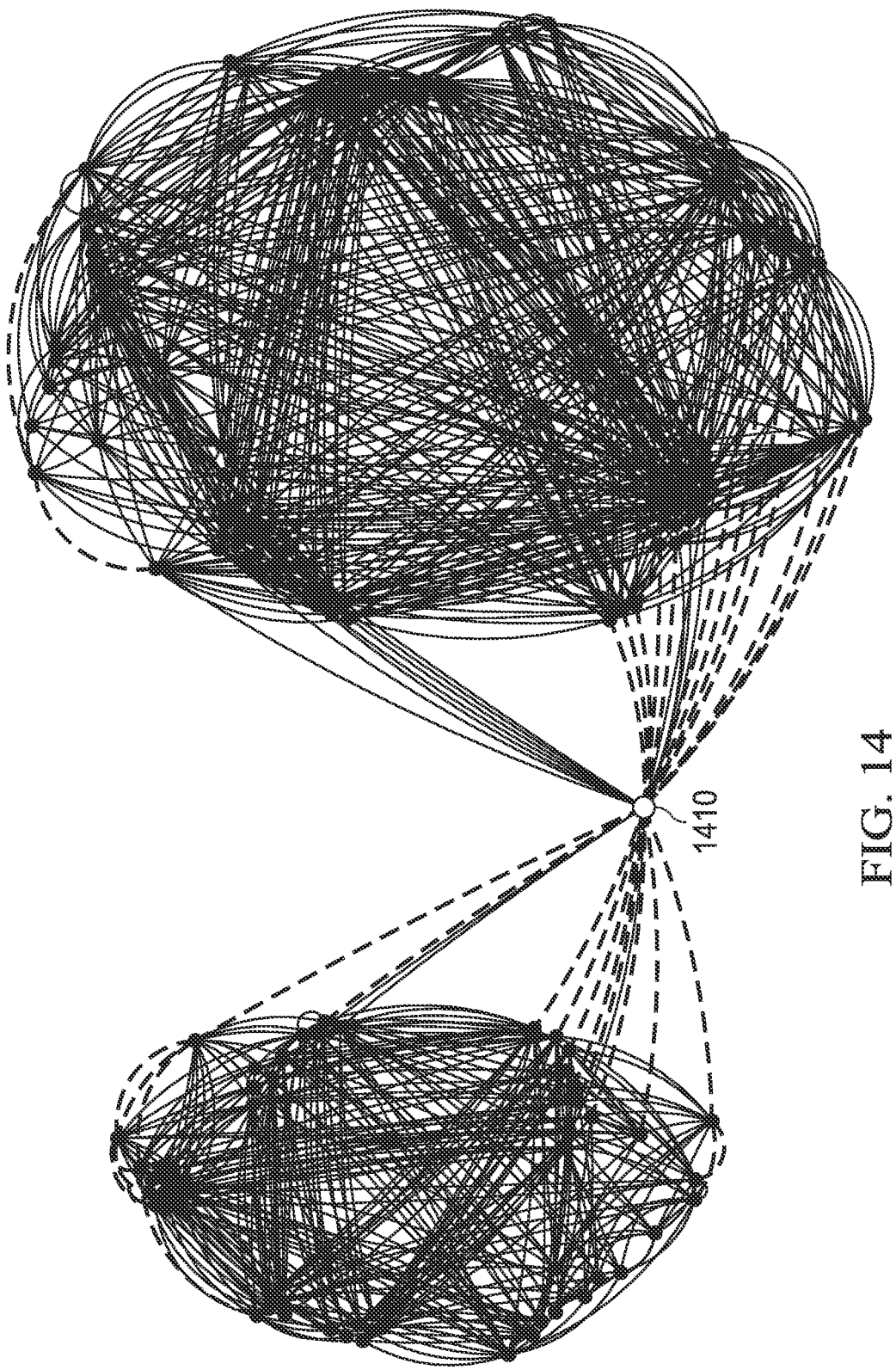
Figure 15:
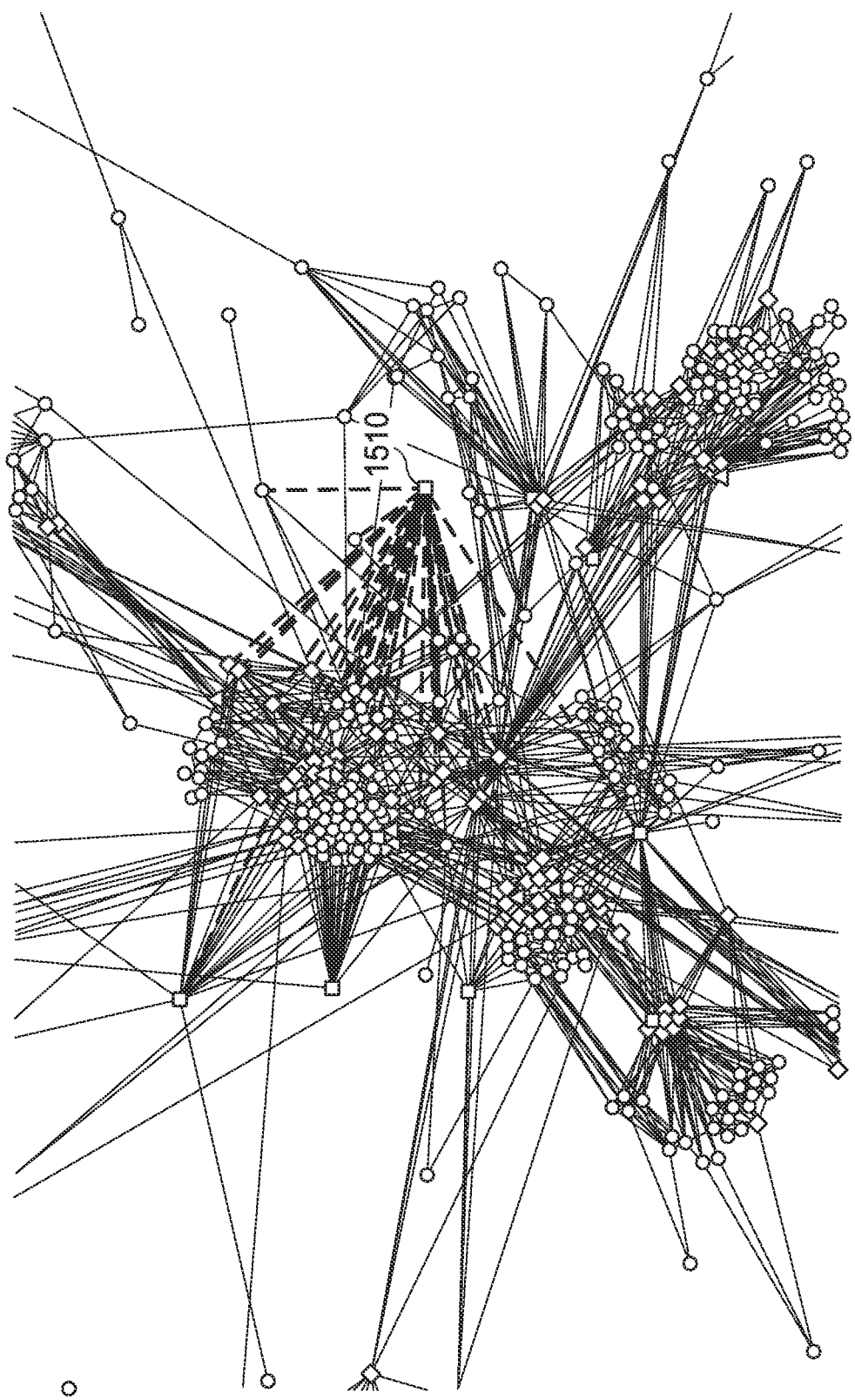

The occurrence of outlier entitlement patterns may also occur on a larger scale when, within a peer group, one or more cliques (or pseudo cliques) overlap, as shown in FIG. 13. As can be seen, overlapping identities may have connections to two or more cliques. This can be explained when two (or more) prevalent entitlement patterns (e.g., roles) have a significant overlap. Depending on the situation, a proper action in such case would be to merge the cliques by unifying the prevalent pattern (role) onto the overlapping cliques or resolve the overlap and separate the entitlement patterns (roles). In one embodiment, a graph algorithm (e.g., k-clique percolation) could be utilized by embodiments of an identity management system to resolve this situation to either unify the existing roles, or to separate them. In another embodiment, the identity management system may be configured with enterprise specific rules such that the identity management system may recommend one action over another. These rules may depend on several factors, such as for example, acceptable peer group size, how critical to the job functions the separation-of-duty implied by separation of roles is, or other criteria.

Another type of outlier that may be identified by an outlier detector 870 is a structural outlier. Identities that are structural outliers may be identities whose representative nodes have special or non-typical configuration in the identity graph. For example, 'bridge' nodes, or nodes with high degree (e.g., or connectivity or number of edges) and in-betweenness values, which could potentially be an indication for exerting a strong influence on their peers. This may have unintended consequences, by facilitating the spread of highly privileged or expensive (e.g., per-user licensed software) entitlements. Specifically, these structural outliers may be identities whose entitlements, and hence the configuration of their strong similarity connections, put them in special locations on the graph where they may unjustifiably serve as major influencers. e.g., causing rapid and uncontrollable spread of privileged access, expensive software licenses, etc. Referring back to FIG. 5, identity node 510 is an example of such a bridge identity or structural outlier. Other examples of such outlier are depicted in FIGS.

14 and 15 which depict respectively, structural outlier identity node 1410 and structural outlier identity node 1510.

To determine such structural outliers then, outlier detector 870 may access the property graph stored in the graph data store 866 and run a centrality measure for each (or a subset such as those related to particular locations, departments, etc.) identity nodes of the property graph to obtain in. Such a centrality measure may be generated by, for example, a betweenness centrality measure, an Eigenvector centrality measure, a Katz centrality measure, a degree centrality measure, or almost any other centrality measure desired. Each identity node with a centrality measure over (or under) some threshold may be deemed a structural outlier, or the identity nodes may be ranked by the centrality measure and a top number of them selected as structural outliers. In some embodiments, different measures of centrality may be used in tandem or combined to generate a centrality measure for a node. For example, a betweenness measure may be utilized to determine nodes which serve as bridge nodes within the property graph, however to reduce the noise generated by such betweenness measures, a connectivity measure such as degree centrality may be used with the betweenness measure to determine a centrality measure for nodes when determining identity nodes that are structural outliers.

Outlier detector 870 may also use data harvested by harvester 862 in association with the graph in the graph data store 866 to identify outliers. For example, the data obtained by harvester 862 may include usage or other event data obtained from systems within the enterprise environment. This usage or event data for the identity management artifacts represented in the graph may be used to determine entitlements (or roles) that are popular (e.g., are assigned to over some threshold number of identities) but are rarely actually utilized (e.g., below some minimum threshold of events or access).

As another example, by leveraging various graph algorithms, such as centrality measures as discussed, outlier detector 870 may be able to determine an effective (e.g., empirical) role hierarchy from a property graph including a role graph. This determined role hierarchy could be compared with an organizational structure for the enterprise (e.g., globally or locally per location, title, etc.) to determine and highlight discrepancies to a user as potentially risky through the user interface 862.

Thus, outlier detector 870 may also analyze a role graph generated by graph generator 864 to identify outlier roles. These outlier roles may include roles that are too similar (e.g., above some threshold similarly level to one another). Roles that exhibit high similarities (e.g., higher than a preset or preconfigured high threshold, e.g., 85%, 95%) may warrant a role consolidation recommendation through the user interface 868 as such roles are almost exactly identical aside from a small portion of their entitlements. Consolidating these roles will help optimize the number of managed roles and make it easier for administrators and role owners to provision and maintain their access models.

Similarly, outlier detector 870 may also identify outliers that are generic roles from a role graph. Outliers identified by the outlier detector 870 may also include fragmented or nested roles. The outlier detector 870 can query the role graph to determine roles having a number of entitlements below some entitlement threshold. Alternatively, the outlier detector 870 may not utilize a property graph and may determine such generic roles from identity management data 854. These generic roles (e.g., with too few entitlements) have the potential to spread to a large group of identities and may be identified as risky to a user through the user interface 868. While fragmenting roles into groups of smaller (per number of entitlements) roles can be desirable, in certain cases this fragmentation process may result in roles becoming too generic with too few entitlements (as discussed above). In such case, the generic role and the immediate hierarchy above it should be exposed to user as potentially risky through the user interface 862 (e.g., with recommendations to remove the identified generic roles).

While embodiments of an identity management system may employ static risk assessment, embodiments of an identity management system may also employ dynamic risk assessment in certain embodiments to detect risk based on an identity graph and data reflecting usage of entitlements over time, or from two or more graphs generated by the identity management systems from data reflecting two or more different points in time. In such dynamic risk assessment, identities with 'abnormal' dynamic patterns (e.g., usage patterns, varied attributes or entitlements) may be identified using the two or more graphs or identity management data related to event in association with those identity graphs. For instance, analyzing the event log data of an enterprise's applications, which can be obtained from identity management systems a 'normal' usage baseline may be established by modeling an aggregated (e.g., averaged, median, etc.) signal for a unit (e.g., department, peer group, etc.). Identities whose usage patterns substantially deviate from this baseline may be identified as outliers and flagged as 'abnormal' or risky identities. Events of interest may include, but not limited to, login attempts, password change, time-stamped ip-inferred user location, application access, time-stamped file access and data transfer, or the like.

Accordingly, embodiments of an identity management system may identify identities with anomalous usage patterns using the property graph. These are identities who utilize their privileged access in manners that are considerably different from the rest of their peer identities (e.g., in a peer group, department, or pre-defined business unit). Such usage patterns may in fact be indicative of serious vulnerabilities. To identify such identities, a model for entitlement usage for a peer group may be created. These models may pertain to one or more individual or aggregated usage signals per each peer group. These usage signals may include, but not limited to, login events, password changes, file or application access, session's time & duration, etc. Event data associated with each of one or more usage signals can thus be obtained by identity management system from one or more systems in enterprise. A predictive model can then be generated from the events corresponding to the usage signals of interest. This predictive model for the aggregated signal may serve as a baseline usage indicator for that peer group. Identities whose usage patterns considerably deviate from the corresponding baseline model may then be flagged by the identity management system as potential risks and recommended by the identity management system to a user for further proper action.

As another example of dynamic risk assessment that may be undertaken by an identity management system, identities with recent substantial attribute changes may be identified. By comparing identity nodes (or other types of nodes) in an identity (or other) graph created at a first time to those identity nodes in an identity graph created at a second time, identity nodes that changed in some manner (e.g., changed peer group, location, title, department, number of entitlements, etc.) may be identified and presented by the identity management system to a user as a potential risk.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system for risk assessment using graphs, comprising:
   a memory;
   a processor device;
   a non-transitory, computer-readable storage medium including instructions executable by the processor device for:
   accessing identity management data obtained from one or more source systems;
   evaluating the accessed identity management data to determine a set of identity management artifacts associated with a set of identities and at least one entitlement in association with the one or more source systems;
   generating a first identity management graph from the identity management data, the first identity management graph comprising nodes for identity management artifacts edges between those nodes, and weights for the edges based on data associated with nodes joined by those edges in accordance with the associated set of identifies or at least one entitlement;
   analyzing the first identity management graph or the identity management data to identify an anomaly;
   identifying an identity management artifact associated with the identified anomaly as a high risk identity management artifact;
   presenting the identified high risk identity management artifact through a user interface of the identity management system to manage vulnerabilities associated with the set of identities or at least one entitlement.

2. The system of claim 1, wherein the analysis of the first identity graph is based on a second identity graph associated with the set of identity management artifacts.

3. The system of claim 2, wherein the first identity graph is associated with a first time and the second identity graph is associated with a second time.

4. The system of claim 3, wherein the second time is previous to the first time or subsequent to the first time.

5. The system of claim 1, wherein the anomaly is identified based on a degree of connectivity or in-betweenness of a node in the first identity management graph associated with the identified identity management artifact.

6. The system of claim 1, wherein the identified identity management artifact is an identity, entitlement, or role.

7. The system of claim 1, wherein the anomaly is an outlier with respect to the first identity management graph.

8. A method for risk at assessment using graphs, comprising:
   accessing identity management data obtained from one or more source systems;
   evaluating the accessed identity management data to determine a set of identity management artifacts associated with a set of identities and at least one entitlement in association with the one or more source systems;
   generating a first identity management graph from the identity management data, the first identity management graph comprising nodes for identity management artifacts edges between those nodes, and weights for the edges based on data associated with nodes joined by those edges in accordance with the associated set of identities or at least one entitlement;
   analyzing the first identity management graph or the identity management data to identify an anomaly;
   identifying an identity management artifact associated with the identified anomaly as a high risk identity management artifact;
   presenting the identified high risk identity management artifact through a user interface of the identity management system to manage vulnerability associated with the set of identities or at least one entitlement.

9. The method of claim 8, wherein the analysis of the first identity graph is based on a second identity graph associated with the set of identity management artifacts.

10. The method of claim 9, wherein the first identity graph is associated with a first time and the second identity graph is associated with a second time.

11. The method of claim 10, wherein the second time is previous to the first time or subsequent to the first time.

12. The method of claim 8, wherein the anomaly is identified based on a degree of connectivity or in-betweenness of a node in the first identity management graph associated with the identified identity management artifact.

13. The method of claim 8, wherein the identified identity management artifact is an identity, entitlement, or role.

14. The method of claim 8, wherein the anomaly is an outlier with respect to the first identity management graph.

15. A non-transitory computer storage readable medium, comprising instructions of risk assessment using graphs for:
   accessing identity management data obtained form one or more source systems;
   evaluating the accessed identity management data to determine a set of identity management artifacts associated with a set of identities and at least one entitlement in association with the one or more source systems;
   generating a first identity management graph from the identity management data, the first identity management graph comprising nodes for identity management artifacts edges between those nodes, and weights for the edges based on data associated with nodes joined by those edges in accordance with the associated set of identities or at least one entitlement;
   analyzing the first identity management graph or the identity management data to identify an anomaly;
   identifying an identity management artifact associated with the identified anomaly as a high risk identity management artifact;

presenting the identified high risk identity management artifact through a user interface of the identity management system to manage vulnerabilities associated with the set of identities or at least one entitlement.

16. The non-transitory computer readable medium of claim 15, wherein the analysis of the first identity graph is based on a second identity graph associated with the set of identity management artifacts.

17. The non-transitory computer readable medium of claim 16, wherein the first identity graph is associated with a first time and the second identity graph is associated with a second time.

18. The non-transitory computer readable medium of claim 17, wherein the second time is previous to the first time or subsequent to the first time.

19. The non-transitory computer readable medium of claim 15, wherein the anomaly is identified based on a degree of connectivity or in-betweenness of a node in the first identity management graph associated with the identified identity management artifact.

20. The non-transitory computer readable medium of claim 15, wherein the identified identity management artifact is an identity, entitlement, or role.

21. The non-transitory computer readable medium of claim 15, wherein the anomaly is an outlier with respect to the first identity management graph.

* * * * *

UNITED STATES PATENT AND TRADEMARK OFFICE
CERTIFICATE OF CORRECTION

| | | |
|---|---|---|
| PATENT NO. | : 12,413,594 B2 | Page 1 of 1 |
| APPLICATION NO. | : 18/600282 | |
| DATED | : September 9, 2025 | |
| INVENTOR(S) | : Mohamed M. Badawy and Jostine Fei Ho | |

It is certified that error appears in the above-identified patent and that said Letters Patent is hereby corrected as shown below:

In the Claims

Claim 1
Column 43, Line 46, delete "identifies" and insert -- identities --

Claim 8
Column 44, Line 5, delete "at"
Column 44, Line 29, delete "vulnerability" and insert -- vulnerabilities --

Claim 15
Column 44, Line 49, delete "form" and insert -- from --

Signed and Sealed this
Sixteenth Day of December, 2025

John A. Squires
*Director of the United States Patent and Trademark Office*